United States Patent Office 3,270,018
Patented August 30, 1966

3,270,018
1,3,5-TRIAZINE ETHERS
Joseph J. Ursprung, Portage, Mich., assignor to The Upjohn Company, Kalamazoo, Mich., a corporation of Delaware
No Drawing. Filed Feb. 13, 1964, Ser. No. 344,547
4 Claims. (Cl. 260—249.9)

This invention relates to novel compositions of matter and to methods for producing them. In particular, this invention relates to novel 1,3,5-triazine ethers of the formula:

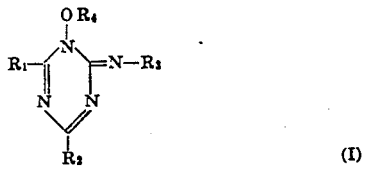

(I)

wherein $R_1$ is seletced from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; wherein $R_2$ is selected from the group consisting of di-lower-alkylamino, di-lower-alkenylamino, N-lower-alkyl-lower-alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 lower alkyls, inclusive, the nitrogen atom of $R_2$ being the point of attachment of $R_2$ to the ring in said formula; wherein $R_3$ is selected from the group consisting of hydrogen, lower alkyl, lower alkenyl, lower cycloalkyl, lower aryl, and lower aralkyl; and wherein $R_4$ is selected from the group consisting of lower alkyl, lower alkenyl, lower alkynyl, lower cycloalkyl, lower aralkyl, lower alkaralkyl, lower alkoxyaralkyl, and lower haloaralkyl. $R_1$, $R_3$, and $R_4$, or any two of them can be the same or different. When $R_2$ is di-lower-alkenyl-amino or di-lower-alkenyl-amino, the alkyls or alkenyls therein can be the same or different. When $R_2$ is a heterocyclic moiety, the alkyls which can be attached thereto can all be different or any two or all of them can be alike. When $R_1$, $R_3$, and/or $R_4$ are alkyl, they can be the same as or different than any of the alkyls associated with $R_2$.

Examples of lower alkyl are methyl, ethyl, propyl, butyl, pentyl, hexyl, heptyl, octyl, and isomeric forms thereof. Examples of lower alkenyl are allyl, 1-methylallyl, 2-methyl-allyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like. Examples of lower alkynyl are 2-propynyl (propargyl), 1-methyl-2-propynyl, 2-butynyl, 3-butynyl, 1-methyl-2-butynyl, 1-methyl-3-butynyl, 3-pentynyl, 4-pentynyl, 1,2-dimethyl-3-butynyl, 2-methyl-3-pentynyl, 3-hexynyl, and the like. Examples of lower alkoxyalkyl are 2-methoxyethyl, 2-ethoxyethyl, 2-butoxyethyl, 2-hexyloxyethyl, 2-octyloxyethyl, 2-methoxypropyl, 3-methoxypropyl, 3-propoxypropyl, 2-methoxybutyl, 3-ethoxybutyl, 4-butoxybutyl, 2-ethoxyhexyl, 3-methoxy-3-methylpentyl, 4-methoxyoctyl, and the like. Examples of lower cycloalkyl are cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-triethylcyclobutyl, cyclopentyl, 2,2-dimethylcyclopentyl, 3-pentylcyclopentyl, 3-tert-butylcyclopentyl, cyclohexyl, 4-tert-butylcyclohexyl, 3-isopropylcyclohexyl, 2,2-dimethylcyclohexyl, cycloheptyl, cyclooctyl, and the like. Examples of lower aryl are phenyl, 1-naphthyl, and 2-naphthyl. Examples of lower alkaryl are o-tolyl, m-tolyl, p-tolyl, m-ethylphenyl, p-tert-butylphenyl, the isomeric forms of xylyl, the isomeric forms of trimethylphenyl, 4-methyl-1-naphthyl, 6-propyl-2-naphthyl, 2,4,5,7-tetramethyl-1-naphthyl, and the like. Examples of lower aralkyl are benzyl, phenethyl, 1-phenylethyl, 2-phenylpropyl, 4-phenylbutyl, 6-phenylhexyl, 5-phenyl-2-methylpentyl, 1-naphthylmethyl, 2-(1-naphthyl)ethyl, 2-(2-naphthyl)ethyl, and the like. Examples of lower alkaralkyl are o-tolylmethyl, m-tolylmethyl, p-tolylmethyl, 4-tert-butylphenylmethyl, 2-(p-tolyl)ethyl, 1-(m-tolyl)ethyl, 3-(o-ethylphenyl)propyl, 4-methyl-1-naphthylmethyl, 6-tert-butyl-2-naphthylmethyl, and the like. Examples of lower alkoxyaralkyl are o-methoxybenzyl, m-methoxybenzyl, p-methoxybenzyl, 2-(m-methoxyphenyl)ethyl, 3-(p-ethoxyphenyl)propyl, 4-(p-tert-butoxyphenyl)butyl, 4-methoxy-1-naphthylmethyl, and the like. Examples of lower haloaralkyl are o-chlorobenzyl, m-fluorobenzyl, p-bromobenzyl, 2-(m-iodophenyl)ethyl, 2,4-dichlorobenzyl, 6-bromo-1-naphthylmethyl, 4-(p-chlorophenyl)butyl, and the like.

Examples of heterocyclic moieties within the scope of $R_2$, in addition to those already mentioned above, are 2-methylaziridinyl, 2-ethylaziridinyl, 2-butylaziridinyl, 2,3-dimethylaziridinyl, 2,2-dimethylaziridinyl, 2-methylazetidinyl, 3-methylazetidinyl, 2-octylazetidinyl, 2,2-dimethylazetidinyl, 3,3-diethylazetidinyl, 2,4,4-trimethylazetidinyl, 2,3,4-trimethylazetidinyl, 2-methylpyrrolidinyl, 3-butylpyrrolidinyl, 2-isohexylpyrrolidinyl, 2,3-dimethylpyrrolidinyl, 2,2-dimethylpyrrolidinyl, 2,5-diethylpyrrolidinyl, 3-tert-butylpyrrolidinyl, 2,3,5-trimethylpyrrolidinyl, 3,4-dioctylpyrrolidinyl, 2-methylpiperidino, 3-methylpiperidino, 4-methylpiperidino, 3-isopropylpiperidino, 4-tert-butylpiperidino, 2-methyl-5-ethylpiperidino, 3,5-dipentylpiperidino, 2,4,6-trimethylpiperidino, 2,6-dimethyl-4-octylpiperidino, 2,3,5-triethylpiperidino, 2-ethylhexahydroazepinyl, 4-tert-butylhexahydroazepinyl, 3-heptylhexahydroazepinyl, 2,4-dimethylhexahydroazepinyl, 3,3-dimethylhexahydroazepinyl, 2,4,6-tripropylhexahydroazepinyl, 2-methylheptamethylenimino, 5-butylheptamethylenimino, 2,4 - diisopropylheptamethylenimino, 3,3 - diethylheptamethylenimino, 2,5,8-trimethylheptamethylenimino, 3-methyloctamethylenimino, 2,9-diethyloctamethylenimino, 4-isooctyloctamethylenimino, 2-ethylmorpholino, 2-methyl-5-ethylmorpholino, 3,3-dimethylmorpholino, 2,6-di-tert-butylmorpholino, and the like. In each of the above examples of heterocyclic moieties, the free valence, and hence the point of attachment to a carbon atom of the triazine ring, is at the heterocyclic nitrogen atom.

The novel 1,3,5-triazine ethers of Formula I are amines, and exist in the non-protonated or free base form, or in the protonated or acid addition salt form depending on the pH of the environment. They form stable protonates, i.e., mono- or diacid addition salts, on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulphonic, cyclohexanesulfamic, picric, and lactic acids, and the like. These acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The Formula I compounds of this invention also form salts with penicillins. These salts have solubility characteristics which cause them to be useful in the isolation and purification of penicillins, particularly benzyl penicillin. Said salts can be formed either by neutralization of the free base form of a compound of Formula I with the free acid form of a penicillin, or by a metathetical exchange of the anion of an acid addition salt of a Formula I compound, for example, the chloride ion of a hydrochloride, with the anionic form of a penicillin.

The compounds of Formula I are orally and parenterally active in birds and mammals, including man, as antihypertensive agents having vasodilatory activity, and are useful for lowering blood pressure and for the treatment of shock. They are also useful as antisecretory agents and central nervous system depressants. For these purposes, they can be used in the non-protonated (free base) form or in the protonated (acid addition salt) form in association with a pharmaceutical carrier in solid or liquid dosage forms, such as tablets, capsules, powders, pills, granules, syrups, elixirs, suppositories, sterile aqueous or vegetable oil dispersions for parenteral use, and the like, alone or in combination with other drugs.

The novel 1,3,5-triazine ethers of Formula I are produced by a process which comprises mixing a 1,2-dihydro-1-hydroxy-1,3,5-triazine of the formula:

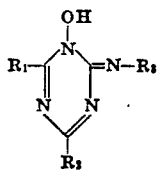

(II)

wherein $R_1$, $R_2$ and $R_3$ are as given above, with an organic halide of the formula, $R_4$–X, wherein $R_4$ is as given above and wherein X is selected from the group consisting of chloride, bromide, and iodide.

Organic halides of the formula, $R_4$–X, are either known in the art or can be produced by methods known in the art, for example, by reaction of the corresponding alcohol with a phosphorus halide, by halogenation of a suitable saturated hydrocarbon, or by addition of a hydrogen halide to a suitable unsaturated hydrocarbon. It was observed that the organic iodides are usually the most reactive and the organic chlorides the least reactive in the novel process of this invention, the organic bromides usually occupying an intermediate position in that regard. It was also observed that 2-alkenyl (allylic), 2-alkynyl, and benzyl-type halides are usually more reactive than organic halides lacking those structural features. It is preferred that 1-alkenyl (vinyl) and 1-alkynyl halides not be used in the novel process of this invention because of the low reactivity of such halides. Examples of suitable organic bromides are methyl bromide, ethyl bromide, n-propyl bromide, isopropyl bromide, n-butyl bromide, sec-butyl bromide, isobutyl bromide, n-pentyl bromide, isopentyl bromide, 2-methylbutyl bromide, 1,2-dimethylpropyl bromide, 1-ethylpropyl bromide, 1-methylbutyl bromide, n-hexyl bromide, isohexyl bromide, 1-methylpentyl bromide, 1-ethylbutyl bromide, 2-methylpentyl bromide, 1,2-dimethylbutyl bromide, allyl bromide, 2-methylallyl bromide, 2-butenyl bromide, 3-butenyl bromide, 1,2-dimethylallyl bromide, 2-ethylallyl bromide, 1-methyl-2-butenyl bromide, 2-methyl-2-butenyl bromide, 3-methyl-2-butenyl bromide, 2,3-dimethyl-2-butenyl bromide, 1,3-dimethyl-2-butenyl bromide, 1-ethyl-2-butenyl bromide, 4-methyl-2-pentenyl bromide, 2-propynyl bromide, 2-butynyl bromide, 1-methyl-2-propynyl bromide, 3-butynyl bromide, 1-methyl-3-butynyl bromide, 3-pentynyl bromide, 4-penynyl bromide, 3-hexynyl bromide, 2-methyl-3-pentynyl bromide, cyclopentyl bromide, cyclohexyl bromide, 2-methylcyclopentyl bromide, 2-methylcyclohexyl bromide, 3-methylcyclohexyl bromide, 4-methylcyclohexyl bromide, 2-ethylcyclopentyl bromide, 3-ethylcyclopentyl bromide, 4-ethylcyclohexyl bromide, 3-isopropylcyclopentyl bromide, 2,3-dimethylcyclohexyl bromide, cycloheptyl bromide, cyclooctyl bromide, 4-tert-butylcyclohexyl bromide, cyclononyl bromide, cyclodecyl bromide, benzyl bromide, phenethyl bromide, 2-phenylpropyl bromide, 3-phenylpropyl bromide, 4-phenylbutyl bromide, 1-naphthylmethyl bromide, 2-naphthlymethyl bromide, o-methylbenzyl bromide, m-methylbenzyl bromide, p-methylbenzyl bromide, 2-(p-tolyl)ethyl bromide, 4-methyl-1-naphthylmethyl bromide, 2,4-xylylmethyl bromide, o-methoxybenzyl bromide, m-methoxybenzyl bromide, p-methoxybenzyl bromide, 4-methoxy-1-naphthylmethyl bromide, o-chlorobenzyl bromide, m-florobenzyl bromide, p-bromobenzyl bromide, and the like. Suitable organic chlorides and iodides are those corresponding to the above bromides.

1,2-dihydro-1-hydroxy-1,3,5-triazines of Formula II can be produced by oxidizing a 1,3,5-triazine of the formula:

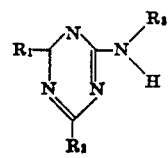

(III)

wherein $R_1$, $R_2$, and $R_3$ are as given above, with a percarboxylic acid. Particularly preferred for this purpose are the perbenzoic acids of the formula:

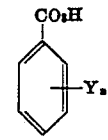

(IV)

wherein Y is selected from the group consisting of halogen, lower alkyl, lower alkoxy, and nitro, and wherein $n$ is from zero to 5, inclusive. However, other percarboxylic acids can be used for this oxidation. Examples of other suitable percarboxylic acids are performic acid, peracetic acid, perpropionic acid, perbutyric acid, perphthalic acid, percamphoric acid, and the like.

Triazines (guanamines) of Formula III are known in the art or can be prepared by methods known in the art [Smolin et al., "s-Triazines and Derivatives," Interscience Publishers, Inc., New York, N.Y., pp. 222–33 (1959)]. For example, they can be prepared by reacting a biguanide of the formula:

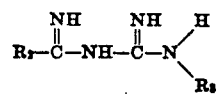

(V)

wherein $R_2$ and $R_3$ are as given above, with a carboxylic acid ester, a carboxylic acid halide, a carboxylic acid anhydride, or a nitrile [e.g., Shapiro et al., J. Am. Chem. Soc. 79, 5064–71 (1957); Shapiro et al., J. Am. Chem. Soc. 81, 3996–4000 (1959); Overberger et al., J. Am. Chem. Soc. 76, 1061–5 (1954); Shapiro et al., J. Org. Chem. 26, 68–74, 3331–4 (1961); Cockburn, Can. J. Chem. 35, 1285–92 (1957); Bamberger et al., Bar. Deut. Chem. 25, 525–33 (1892); Thurston, U.S. Patent 2,427,314; Schaefer, U.S. Patent 2,777,848]. Illustratively, 2-anilino-4-dimethylamino-6-methyl-1,3,5-triazine is prepared by reacting 1,1-dimethyl-5-phenylbiguanide (Formula V; $R_2$=dimethylamino; $R_3$=phenyl) with acetyl chloride in the presence of sodium hydroxide [e.g., Shapiro et al., J. Org. Chem. 26, 68–74 (1961)]. Further, 2-amino-4-methyl-6-piperidino-1,3,5-triazine is prepared by reacting 1,1-pentamethylene-biguanide (Formula V; $R_2$=piperidino; $R_3$=hydrogen) first with acetic anhydride and then with sodium hydroxide [e.g., Cockburn et al., Can. J. Chem. 35, 1285–92 (1957)].

Other examples of Formula V biguanides suitable for preparing triazines within the scope of Formula III are
1,1-dimethylbiguanide,
1,1-diethylbiguanide,
1,1-dipropylbiguanide,
1,1-dibutylbiguanide,
1,1-di-tert-butylbiguanide,
1,1-diallyl-biguanide,
1-allyl-1-methylbiguanide,
1-ethyl-1-(2-methylallyl)-biguanide,
1,1-di-4-hexenylbiguanide,
1,1-ethylenebiguanide,
1,1-trimethylenebiguanide,
1,1-tetramethylenebiguanide,
1,1-(1,1-dimethyltetramethylene)biguanide,
1,1-(2,3-dioctyltetramethylene)biguanide,
1,1-(4-ethyl-1-methylpentamethylene)-biguanide,
1,1-(1,3,5-trimethylpenetamethylene)biguanide,
1,1-hexamethylenebiguanide,
1,1-octamethylenebiguanide,
1,1-(3-oxapentamethylene)biguanide,
1,1,5-trimethylbiguanide,, 5-butyl-1,1-diethylbiguanide,
1,1,5-triallylbiguanide,
1-allyl-5-cyclobutyl-1-ethylbiguanide,
5-(2,6-dimethylphenyl)-1,1-(3-oxapentamethylene)-biguanide,
1,1-diallyl-5-phenethylbiguanide, and the like. Other examples of acid halides and anhydrides, and examples of esters and nitriles, which can be reacted with biguanides within the scope of Formula V to prepare triazines within the scope of Formula III are ethyl formate, ethyl acetate, ethyl propionate, butyryl chloride, methyl octanoate, ethyl acrylate, acryoyl chloride, 4-hexenoyl chloride, methyl 4-methyl-2-octenoate, ethyl 3-ethoxypropionate, isopropoxyacetonitrile, 2-propoxypropionitrile, 3-methoxypropionyl chloride, methyl cyclopropanecarboxylate, cyclohexanecarbonyl chloride, ethyl 4-tert-butylcyclohexanecarboxylate, methyl benzoate, p-toluoyl chloride, ethyl 2,6-dimethylbenzoate, ethyl 1-naphthoate, ethyl phenylacetate, p-chlorobenzoyl chloride, methyl p-bromobenzoate, methyl p-methoxyphenylacetate, ethyl o-ethylphenylacetate, and the like.

Biguanides of Formula V suitable for preparing Formula III triazines, for example, each of the specific biguanides mentioned above, are either known in the art or can be prepared by methods known in the art [e.g., Shapiro et al., J. Am. Chem. Soc. 81, 3725–36, 3996–4000, 4635–9 (1959); Shapiro et al., J. Org. Chem. 26, 68–74 (1961); Detweiler et al., J. Am. Chem. Soc. 74, 1483–5 (1952); Oxley et al., J. Chem. Soc. 1252–6 (1951); Cockburn et al., Can. J. Chem. 35, 1285–92 (1957)]. For example, biguanides of Formula V wherein $R_3$ is hydrogen can be prepared by reacting cyanoguanidine (dicyandiamide) with a secondary amine salt, for example, the hydrochloride, according to the equation:

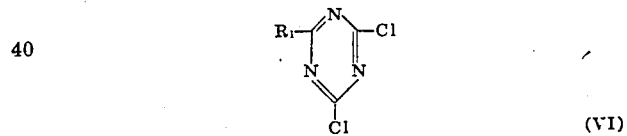

wherein $R_2$ is as given above. Illustratively, 1,1-pentamethylenebiguanide hydrochloride is prepared by heating a mixture of piperidine hydrochloride and cyanoguanidine [e.g., Shapiro et al., J. Am. Chem. Soc. 81, 3725–36 (1959)]. Biguanides of Formula V wherein $R_3$ is as given above and not hydrogen can be prepared by reacting a secondary amine salt, e.g., the hydrochloride, with a 3-monosubstituted 1-cyanoguanidine, or by reacting a primary amine salt, e.g., the hydrochloride, with a 3,3-disubstituted 1-cyanoguanidine, according to the equations:

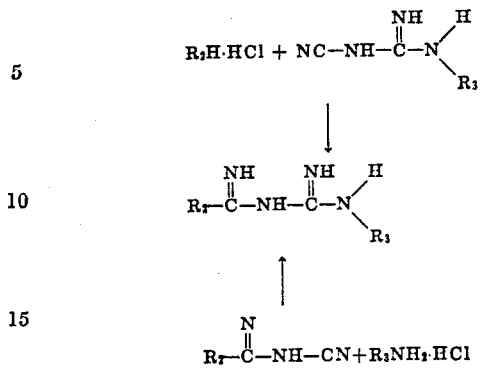

Illustratively, 1,1-dimethyl-5-propylbiguanide hydrochloride (Formula V; $R_2$=dimethylamino; $R_3$=propyl) is prepared either by heating a mixture of dimethylamine hydrochloride and 1-cyano-3-propylguanidine or by heating a mixture of propylamine hydrochloride and 1-cyano-3,3-dimethylguanidine [e.g., Shapiro et al., J. Am. Chem. Soc. 81, 4635–9 (1959)]. 3-Monosubstituted 1-cyanoguanidines and 3,3-disubstituted 1-cyanoguanidines suitable for preparing Formula V biguanides as above described are known in the art or can be prepared by methods known in the art, for example, by reacting a primary or a secondary amine with an alkali metal salt of dicyanimide [e.g., Shapiro et al., J. Am. Chem. Soc. 81, 4635–9 (1959); Redmon et al., U.S. Patent 2,455,807].

Another method for preparing triazines within the scope of Formula III starts with the reaction of cyanuric chloride with one molecular equivalent of a Grignard reagent of the Formula $R_1MgX$, wherein $R_1$ is as given above (except hydrogen), thereby producing a triazine of the formula:

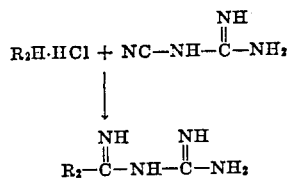

(VI)

[Hirt et al., Helv. Chim. Acta 33, 1365–9 (1950); Overberger et al., J. Am. Chem. Soc. 79, 941–8 (1957)]. Then, one of the chlorines in the Formula VI triazine is replaced with a primary amino group, i.e., —$NH_2$, or a secondary amino group, i.e., —$NHR_3$, and the other chlorine is replaced with a tertiary amino group, i.e., —$R_2$, wherein $R_2$ and $R_3$ are as defined above. These two replacements are accomplished by successive separate reactions of the Formula VI triazine with one molecular equivalent of ammonia or a primary amine and with one molecular equivalent of a secondary amine, in either order. These reactions are carried out by procedures known in the art to be useful for replacing the chlorines of chlorotriazines with primary, secondary, or tertiary amino groups [e.g., Hirt et al., Helv. Chim. Acta 33, 1365–9 (1950); Overberger et al., J. Am. Chem. Soc. 79, 941–8 (1957); Thurston et al., J. Am. Chem. Soc. 73, 2981–3 (1951); Kaiser et al., J. Am. Chem. Soc. 73, 2984–6 (1951); Schaefer et al., J. Am. Chem. Soc. 77, 5918–22 (1955); Campbell et al., J. Org. Chem. 26, 2786–9 (1961); Kaiser et al., U.S. Patent 2,653,934]. Illustratively, 2,4-dichloro-6-methyl-1,3,5-triazine is prepared by reacting cyanuric chloride with methylmagnesium bromide, and is transformed first to 2-benzylamino-4-chloro-6-methyl-1,3,5-triazine by reaction with benzylamine, and then to 2-benzylamino-4-diallylamino-6-methyl-1,3,5-triazine by reaction with diallylamine. Alternatively, the 2,4-dichloro-6-methyl-1,3,5-triazine is reacted first with diallylamine to produce 2-chloro-4-diallylamino-6-methyl-1,3,5-triazine and then with benzylamine to produce the same 2-benzylamino-4-diallylamino-6-methyl-1,3, 5-triazine (Formula III; $R_1$=methyl; $R_2$=diallylamino; $R_3$=benzyl). Examples of suitable primary amines for this purpose are methylamine, ethylamine, propylamine, isopropylamine, butylamine, secbutylamine, pentylamine, isopentylamine, hexylamine, heptylamine, octylamine, allylamine, 2-methylallylamine, 2-butenylamine, 3-butenylamine, 3-pentenylamine, 4-hexenylamine, 4,4-dimethyl-2-pentenylamine, cyclobutylamine, cyclohexylamine, 4-tert-butylcyclohexylamine, aniline, 1-naphthylamine, 2-naphthylamine, benzylamine, phenethylamine, and the like. Examples of suitable secondary amines for this purpose are dimethylamine,
diethylamine,
N-methylethylamine,
dipropylamine,
N-ethylisopropylamine,
di-sec-butylamine,
N-methylbutylamine,
dipentylamine,
N-ethyl-2,4-dimethylpentylamine,
N-methyloctylamine,
diheptylamine,
diallylamine,
N-methylallylamine,
di-1-methylallylamine,
di-2-methylallylamine,
N-ethyl-1-methylallylamine,
N-propyl-2-ethylallylamine,
di-2-pentenylamine,
di-3-butenylamine,
di-4-hexenylamine,
N-butyl-2-butenylamine,
di(4-methyl-3-hexenyl)amine,
aziridine,
2-methylaziridine,
2,2-dimethylaziridine,
azetidine,
2-ethylazetidine,
3-octylazetidine,
3,3-dimethylazetidine,
2,2,4-trimethylazetidine,
pyrrolidine,
2-propylpyrrolidine,
3-butylpyrrolidine,
2-isohexylpyrrolidine,
2,3-dimethylpyrrolidine,
2,2,4-trimethylpyrrolidine,
2,5-diethylpyrrolidine,
3,4-dioctylpyrrolidine,
piperidine,
2-methylpiperidine,
3-ethylpiperidine,
4-butylpiperidine,
2,4,6-trimethylpiperidine,
2-methyl-5-ethylpiperidine,
3,5-dipentylpiperidine,
hexahydroazepine,
2-ethylhexahydroazepine,
4-tertbutylhexahydroazepine,
3,3-dimethylhexahydroazepine,
2,4,6-tripropylhexahydroazepine,
heptamethylenimine,
2-methylheptamethylenimine,
2,4-diisopropylheptamethylenimine,
octamethylenimine,
4-isooctyloctamethylenimine,
morpholine,
2-ethylmorpholine,
2-methyl-5-ethylmorpholine,
2,6-dimethylmorpholine, and the like. Examples of suitable Grignard reagents for this purpose are ethylmagnesium chloride, propylmagnesium bromide, butylmagnesium chloride, isobutylmagnesium bromide, hexylmagnesium chloride, 3-pentenylmagnesium bromide, 4-hexenylmagnesium chloride, cyclopentylmagnesium bromide, cyclohexylmagnesium chloride, 4-tert-butylcyclohexylmagnesium bromide, phenylmagnesium bromide, p-tolylmagnesium iodide, benzylmagnesium bromide, p-ethylbenzylmagnesium bromide, o-methoxybenzylmagnesium bromide, p-chlorobenzylmagnesium bromide, and the like.

Triazines within the scope of Formula III can also be prepared by reacting a triazine of the formula:

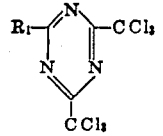

(VII)

wherein $R_1$ is as given above, first with ammonia or an appropriate primary amine, and then with an appropriate secondary amine [Kreutzberger, J. Am. Chem. Soc. 79, 2629–33 (1957); Schroeder et al., J. Am. Chem. Soc. 78, 2447–51 (1956)]. If desired, the replacement reactions can be carried out first with the secondary amine, and then with ammonia or the primary amine. Primary and secondary amines suitable for this purpose are those listed above as being suitable for replacing the chlorines of dichlorotriazines (Formula VI).

Percarboxylic acids suitable for the oxidation of Formula III triazines to Formula II 1,2-dihydro-1-hydroxy-1,3,5-triazines are known in the art or can be prepared by methods known in the art. With regard to the preferred Formula IV perbenzoic acids, see especially Braun, Organic Syntheses, Coll. vol. I, 2d Ed., 431 (1941) and Silbert et al., J. Org. Chem. 27, 1336–42 (1962). In Formula IV, when $n$ is 2 or more, the Y's can be the same or different. Examples of halogen are fluorine, chlorine, bromine, and iodine. Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Illustrative oxidizing acids of Formula IV include perbenzoic acid, o-, m-, and p-chloro- and bromoperbenzoic acids, 3,5-dichloroperbenzoic acid, 2,3,5,6-tetrachloroperbenzoic acid, 4-methylperbenzoic acid, 3,4-dimethylperbenzoic acid, pentamethylperbenzoic acid, o-, m-, and p-methoxy perbenzoic acids, 3-nitroperbenzoic acid, 2,4-dinitroperbenzoic acid, 3-chloro-4-methoxyperbenzoic acid, 3-chloro-4-nitroperbenzoic acid, and the like.

In carrying out the reaction between the Formula III triazine and the Formula IV perbenzoic acid, the two reactants are mixed advantageously below about 50° C., preferably between about −10° and +10° C., although higher or lower temperatures can be used. It is preferred to mix the reactants in the presence of an inert solvent and to stir the mixture until the reaction is substantially complete. Suitable solvents include N-lower-alkylpyrrolidones, e.g., N-methylpyrrolidone; lower alkanols, e.g., methanol, ethan ol, propanol, isopropyl alcohol, the butanols and the pentanols; lower alkanol and glycol esters of lower alkanoic acids, e.g., ethyl acetate, butyl acetate, pentyl acetate, ethylene glycol monoacetate, diethylene glycol monoacetate; ethers, e.g., diethyl ether, diisopropyl ether, ethylene glycol monoethyl ether, diethylene glycol monobutyl ether; and the like. The molecular ratio of Formula III triazine and Formula IV perbenzoic acid can be varied widely. Ratios from about 1:1 to 1:5, preferably from about 1:1.5 to 1:2.5, are suitable.

Many Formula III triazines with carbon-carbon double bond unsaturation in any or all of $R_1$, $R_2$, and $R_3$ can be oxidized to corresponding Formula II 1,2-dihydro-1-hydroxy-1,3,5-triazines without double bond epoxidation, particularly when the double bonds are part of lower 2-alkenyl groupings. If the double bonds are not resistant to epoxidation, they can be protected before and regenerated after the oxidation. For example, a double bond can be brominated, the compound oxidized, and the double bond regenerated by treatment with zinc metal in a solvent such as ethanol. Alternatively, epoxidation can be allowed to occur and the epoxy group transformed back to a double bond. An example is the procedure of Cornforth et al., J. Chem. Soc. 112–27 (1959), involving treatment of an epoxide with a mixture of sodium iodide, sodium acetate, zinc, and acetic acid. Other methods of producing Formula II compounds with carbon-carbon double bonds in an $R_1$, $R_2$, or $R_3$ grouping involve starting with Formula III triazines, one $R_1$, $R_2$, or $R_3$ carbon atom of which is attached to a halogen, e.g., bromine or iodine, another carbon atom vicinal to that carbon atom being attached to a lower alkoxy, e.g., methoxy, or to a carboxy. After the oxidation, the halogen plus lower alkoxy are removed by zinc treatment [Dykstra et al., J. Am. Chem. Soc. 52, 3396–3404 (1930)], or the halogen plus carboxyl are removed by sodium carbonate treatment [Young et al., J. Am. Chem. Soc. 51, 2528–34 (1929)]. Other methods of protecting, regenerating, or introducing carbon-carbon double bonds to produce desired unsaturated Formula II 1,2-dihydro-1-hydroxy-1,3,5-triazines will be apparent to those skilled in the art.

The 1,2-dihydro-1-hydroxy-1,3,5-triazine of Formula II can be isolated from the oxidation reaction mixture by conventional techniques, for example, by successive evaporation of the reaction solvent at reduced pressure, solution of the basic Formula II product in aqueous acid, e.g., hydrochloric acid, removal of undesired water-insoluble reaction products by filtration, neutralization of the acidic filtrate, and isolation of the formula II product by filtration, extraction, or chromatography. The isolated material can be purified by conventional techniques, for example, by recrystallization from a suitable solvent or pair of solvents, or by preparation of an acid addition salt, e.g., the hydrochloride or acid phosphate, and recrystallization of the salt, followed, if desired, by reconversion of the salt to the free base in the usual manner.

1,2-dihydro-1-hydroxy-1,3,5-triazines within the scope Formula II and containing one or more lower alkenyls can be transformed by hydrogenation to other Formula II products containing lower alkyls in place of the lower alkenyls. In this process, each lower alkenyl is hydrogenated to the corresponding lower alkyl. The Formula II reactant is not otherwise altered by the hydrogenation. For example, a Formula II compound wherein $R_1$ is vinyl, or wherein $R_2$ is diallylamino, or wherein $R_3$ is allyl is transformed to the corresponding Formula II compound wherein $R_1$ is ethyl, or wherein $R_2$ is dipropylamino, or wherein $R_3$ is propyl. This hydrogenation is preferably carried out in the presence of a hydrogenation catalyst, for example, a noble metal, e.g., platinum, palladium, rhodium, or a base metal, e.g., Raney nickel, Raney cobalt, and in the presence of an inert solvent, for example, methanol, ethanol, dioxane, ethyl acetate, and the like. Hydrogenation pressures ranging from about atmospheric to about 50 p.s.i., and hydrogenation temperatures ranging from about 10° to about 100° C. are preferred. The 1,2-dihydro-1-hydroxy-1,3,5-triazine product can be isolated by conventional techniques, for example, by filtration of the catalyst and evaporation of the solvent, and can be purified as described above.

To carry out the reaction between the Formula II 1,2-dihydro-1-hydroxy-1,3,5-triazine and the organic halide of formula, $R_4$—X, the two reactants are mixed, preferably in the presence of an inert liquid diluent. When a diluent is used, it is preferred that it be sufficiently inert under the conditions of the reaction to be recoverable substantially unchanged when the reaction is complete, that it dissolve substantial amounts of both reactants, and that it be sufficiently volatile so that it can subsequently be removed from the reaction mixture by distillation. Especially preferred are liquid diluents of moderate to high polarity. Examples of suitable diluents are lower alkanols, e.g., methanol, ethanol, propanol, isopropyl alcohol, the butanols, and the pentanols; lower alkanones, e.g., acetone, methyl ethyl ketone, and diethyl ketone; lower alkanol and glycol esters of lower alkanoic acids, e.g., ethyl acetate, butyl acetate, methyl propionate, ethylene glycol monoacetate, diethylene glycol monoacetate; tertiary amides, e.g., dimethylformamide, N-methylpyrrolidone; dialkyl sulfoxides, e.g., dimethyl sulfoxide; and the like. The amount of diluent is not critical, sufficient preferably being used to give a reaction mixture which initially is homogeneous. Usually it is advantageous to use about one to about 20 parts by weight of diluent per part by weight of the combined reactants.

Although one mole of organic halide is required to react with each mole of Formula II 1,2-dihydro-1-hydroxy-1,3,5-triazine, it is usually advantageous to use an excess of the halide to insure more complete reaction of the more expensive triazine and, in the case of the relatively volatile halides, to insure that at least one mole of the halide is available for each mole of triazine. It is usually satisfactory to use about 1.5 to about 10 moles of halide per mole of triazine although a lesser or greater excess can be used if desired.

It is usually satisfactory to carry out the interaction of organic halide and 1,2-dihydro-1-hydroxy-1,3,5-triazine at about 25° C. The desired reaction can be accelerated by heating but there is usually no reason to heat at a temperature higher than about 150° C.

The time required for reaction between organic halide and 1,2-dihydro-1-hydroxy-1,3,5-triazine will depend on such factors as the specific nature and amounts of the reactants, the reaction temperature, and the nature and amount of diluent, if one is used. It is usually satisfactory to maintain a reaction mixture at about 25° C. for about 12 to about 200 hours. At a higher reaction temperature, for example, about 75° to about 100° C., the necessary reaction time will usually be shorter. It is advantageous in determining the necessary reaction time to make use of the fact that 1,2-dihydro-1-hydroxy-1,3,5-triazines usually change the color of an ethanol solution of ferric chloride to a darker color, often to dark red. The desired 1,3,5-triazine ether does not usually change the color of a ferric chloride solution in that manner. Therefore, the course of the reaction can often be followed by adding a few drops of ethanolic ferric chloride to a small portion of the reaction mixture. When the reaction mixture no longer darkens the ferric chloride solution, the reaction is usually complete.

The reaction between organic halide and 1,2-dihydro-1-hydroxy-1,3,5-triazine usually produces a 1,3,5-triazine ether in the form of an acid addition salt, the acid corresponding to the particular halide used. Thus, use of an organic chloride produces a 1,3,5-triazine ether hydrochloride. These acid addition salts can be isolated and purified by conventional techniques, for example, by evaporation of the diluent and recrystallization of the salt from a suitable solvent or mixture of solvents. If the 1,3,5-triazine ether free base is desired, the purified or unpurified acid addition salt can be mixed with at least one equivalent of a base, preferably in aqueous solution. Suitable bases include ammonia, sodium hydroxide, potassium carbonate, and the like. The resulting free base can then be isolated by conventional techniques, for example by filtration or extraction with an immiscible solvent, followed by evaporation of the solvent from the extract. The free base can be purified also by conventional techniques, for example by recrystallization from a suitable solvent or mixture of solvents or by chromatography.

Other monoacid or diacid addition salts than those obtained directly from the reaction mixture can be produced by neutralization of the 1,3,5-triazine ether with appropriate amounts of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I amine, the acid, and the acid addition salt. If the acid is soluble in water, the basic compound of Formula I can be dissolved in water containing either one or two equivalent amounts of the acid, and thereafter, the water can be removed by evaporation. If the acid is soluble in a relatively non-polar solvent, for example, diethyl ether or diisopropyl ether, separate solutions of the acid and the basic Formula I compound in such a solvent can be mixed in equivalent amounts, whereupon the acid addition salt will usually precipitate because of its relatively low solubility in the non-polar solvent. Alternatively, the basic Formula I compound can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. Either monoacid or diacid salts can be formed by using one or two equivalents, respectively, of the acid.

Acid addition salts, for example, those obtained directly by interaction of organic halides and 1,2-dihydro-1-hydroxy-1,3,5-triazines can be transformed to other acid addition salts by a metathetical exchange of the original acid addition salt anion, e.g., the chloride ion, with another anion, for example, as described above with regard to the formation of penicillin salts.

The invention can be more fully understood by the following examples:

EXAMPLE 1

*Part A.—2-amino-4-diallylamino-6-methyl-1,3,5-triazine*

Sodium metal (3.45 g.; 0.15 gram atom) was reacted with 50 ml. of methanol, and the mixture was added to a stirred solution of 1,1-diallylbiguanide hydrochloride (16.6 g.; 0.076 mole) in 100 ml. of methanol at about 25° C. Ethyl acetate (7.0 g.; 0.08 mole) was then added to the resulting stirred mixture. After stirring for an additional 40 hours at 25° C., 300 ml. of water was added. The solid which precipitated on cooling was filtered and dried to give a solid (9.0 g.; M.P. 68–70° C.) which, on recrystallization from a mixture of methanol and water, gave 8.5 g. of 2-amino-4-diallylamino-6-methyl-1,3,5-triazine in the form of colorless needles; M.P. 81–82° C.

*Part B.—1,2-dihydro-1-hydroxy-4-diallylamino-2-imino-6-methyl-1,3,5-triazine*

A solution of perbenzoic acid (6.9 g.; 0.05 mole) in 50 ml. of ethanol was added gradually during 20 minutes to a stirred suspension of 2-amino-4-diallylamino-6-methyl-1,3,5-triazine (5.1 g.; 0.025 mole) in 50 ml. of ethanol at 5° C. The resulting mixture was stirred for 18 hours at 0–5° C. Solvent was evaporated under reduced pressure, and a solution of 10 ml. of concentrated hydrochloric acid in 15 ml. of water was added to the residue. The resulting suspension was filtered, the filter cake being washed twice with 50-ml. portions of water. The combined filtrate and washings were adjusted to pH 9 with aqueous 50% sodium hydroxide solution. The solid which separated was filtered and washed with 50 ml. of water. The filtrate and washings were combined and extracted with twelve 250-ml. portions of chloroform. The chloroform extracts were combined and dried with sodium sulfate. Evaporation of the chloroform gave a solid residue which was recrystallized from acetonitrile to give 3.65 g. of 1,2-dihydro-1-hydroxy-4-diallylamino-2-imino-6-methyl-1,3,5-triazine; M.P. 132–134° C.

*Part C.—1,2-dihydro-1-allyloxy-4-diallylamino-2-imino-6-methyl-1,3,6-triazine*

A solution containing 1,2-dihydro-1-hydroxy-4-diallylamino - 2 - imino - 6 - methyl-1,3,5-triazine (4.0 g.; 0.018 mole) and allyl chloride (4.0 g.; 0.052 mole) in 10 ml. of ethanol was allowed to stand at about 25° C. for 64 hours. At the end of that time, the above-discussed ferric chloride test was negative. The solvent was removed under reduced pressure and the residue was dissolved in about 20 ml. of acetonitrile. The acetonitrile solution was filtered and diluted with about 100 ml. of diethyl ether. The solid which precipitated was filtered and recrystallized twice more from a mixture of acetonitrile and diethyl ether to give 1.45 g. of 1,2-dihydro-1 - allyloxy - 4-diallylamino-2-imino-6-methyl-1,3,5-triazine hydrochloride; M.P. 131–132° C.

*Analysis.*—Calcd. for $C_{13}H_{20}ClN_5O$: C, 52.43; H, 6.77; N, 23.52; Cl, 11.91. Found: C, 50.89; H, 6.81; N, 22.91; Cl, 11.88.

*U.V.:*

($H_2O$) 227 m$\mu$ ($\epsilon$=23,550); 242 m$\mu$ ($\epsilon$=20,450).
(0.01 N $H_2SO_4$) 227 m$\mu$ ($\epsilon$=23,650); 242 m$\mu$ (sh) ($\epsilon$=20,750).
(0.01 N NaOH) 235 m$\mu$ (sh) ($\epsilon$=7,050); 246 m$\mu$ (sh) ($\epsilon$=6,250).

*N.M.R.:*

The nuclear magnetic resonance spectrum of this compound was observed in deuterochloroform on a Varian A–60 spectrophotometer. The following absorption frequencies measured in cycles per second were observed downfield from tetramethylsilane which was arbitrarily set at 0 c.p.s. C—CH$_3$: 163 (3H); NCH$_2$: 253,257 (4H); OCH$_2$: 290,302 (2H); =CH$_2$ on NCH$_2$CH=CH$_2$: multiplet 304–319 (4H); =CH$_2$ on OCH$_2$CH=CH$_2$: multiplet 323–347 (2H); —CH=: multiplet 350–400 (3H); exchangeable H's, very broad peaks at 450 and 550 (2H).

1,2 - dihydro - 1 - allyloxy - 4-diallylamino-2-imino-6-methyl-1,3,5-triazine free base was obtained by dissolving the hydrochloride in water and adding excess aqueous ammonia solution. The solid free base which separated was filtered and dried.

EXAMPLE 2

*Part A.—2-amino-4-diallylamino-1,3,5-triazine*

Sodium metal (4.6 g.; 0.20 gram atom) was reacted with 100 ml. of methanol, and the mixture was added to a stirred solution of 1,1-diallylbiguanide hydrochloride (21.8 g.; 0.10 mole) in 50 ml. of methanol at about 25° C. Ethyl formate (7.4 g.; 0.10 mole) was then added to the resulting stirred mixture during 5 minutes at 25° C. After stirring for an additional 48 hours at 25° C., the solvent was removed under reduced pressure and about 50 ml. of water was added to the residue. The colorless needles which formed were filtered and recrystallized from a mixture of ethanol and water to give 11.6 g. of 2-amino-4-diallylamino-1,3,5-triazine; M.P. 113–116° C.

*Part B.—1,2-dihydro-1-hydroxy-4-diallylamino-2-imino-1,3,5-triazine*

Following the procedure of Example 1, Part B, 2-amino-4-diallylamino-1,3,5-triazine (5.1 g.; 0.027 mole) was oxidized with perbenzoic acid (6.9 g.; 0.05 mole) in 50 ml. of ethanol. Recrystallization of the product from acetonitrile gave 2.3 g. of 1,2-dihydro-1-hydroxy-4-diallylamino-2-imino-1,3,5-triazine; M.P. 139–141° C.

Part C.—1,2-dihydro-1-methoxy-4-diallylamino-2-imino-1,3,5-triazine

Following the procedure of Example 1, Part C, 1,2-dihydro-1-hydroxy-4-diallylamino-2-imino-1,3,5-triazine (5.2 g.; 0.025 mole) was reacted with methyl iodide (7.1 g.; 0.05 mole) to give 1,2-dihydro-1-methoxy-4-diallylamino-2-imino-1,3,5-triazine hydriodide. The corresponding free base was obtained by adding excess aqueous ammonia to the hydriodide. The free base is transformed to the corresponding sulfuric acid addition salt by adding one equivalent of sulfuric acid to an absolute ethanol solution of the free base followed by addition of several volumes of diethyl ether to precipitate the salt.

EXAMPLE 3

Part A.—1,2-dihydro-1-hydroxy-4-dipropylamino-2-imino-6-methyl-1,3,5-triazine A mixture of 1,2-dihydro-1-hydroxy-4-diallylamino-2-imino-6-methyl-1,3,5-triazine (1.00 g.; 0.0045 mole), 25 ml. of ethanol, and 10 mg. of platinum oxide was shaken with hydrogen at 50 lbs. initial pressure for 10 minutes at 25° C. The decrease in hydrogen pressure indicated uptake of 0.009 mole of hydrogen. After removal of catalyst by filtration, solvent was removed under reduced pressure and the residue was recrystallized twice from acetonitrile to give 0.65 g. of 1,2-dihydro-1-hydroxy-4-dipropylamino-2-imino-6-methyl-1,3,5-triazine; M.P. 145–147° C.

Part B.—1,2-dihydro-1-benzyloxy-4-dipropylamino-2-imino-6-methyl-1,3,5-triazine Following the procedure of Example 1, Part C, 1,2-dihydro-1-hydroxy-4-dipropylamino-2-imino-6-methyl-1,3,5-triazine (5.6 g.; 0.025 mole) was reacted with benzyl chloride (6.3 g.; 0.05 mole) to give 1,2-dihydro-1-benzyloxy-4-dipropylamino-2-imino-6-methyl-1,3,5-triazine hydrochloride. The corresponding free base was obtained by adding excess aqueous ammonia to the hydrochloride.

EXAMPLE 4

Part A.—2-amino-4-diallylamino-6-ethyl-1,3,5-triazine

Sodium metal (18.4 g.; 0.80 gram atom) was reacted with 300 ml. of methanol, and the mixture was added to a stirred solution of 1,1-diallylbiguanide hydrochloride (87.0 g.; 0.40 mole) in 300 ml. of methanol at about 25° C. Ethyl propionate (44.9 g.; 0.44 mole) was then added to the resulting stirred mixture at 25° C. After stirring for 71 hours at 25° C., the reaction mixture was diluted with 2000 ml. of water and cooled. The solid which precipitated was filtered and recrystallized from a mixture of methanol and water to give 57.1 g. of 2-amino-4-diallylamino-6-ethyl-1,3,5-triazine in the form of white crystals; M.P. 65–66° C.

Part B.—1,2-dihydro-1-hydroxy-4-diallylamino-6-ethyl-2-imino-1,3,5-triazine Finely divided m-chloroperbenzoic acid (95% pure; 9.0 g.; 0.05 mole) was added gradually during 20 minutes to a stirred solution of 2-amino-4-diallylamino-6-ethyl-1,3,5-triazine (5.5 g.; 0.025 mole) in 150 ml. of absolute ethanol at 5° C. The resulting reaction mixture was stirred 8 hours at 0–5° C. and 15 hours while rising gradually to 25° C. Solvent was removed at reduced pressure, and a solution of 5 ml. of concentrated hydrochloric acid in 200 ml. of water was added to the white solid residue. This mixture was filtered. The filter cake was washed with water, and the combined filtrate and washings were adjusted to pH 9 with aqueous sodium hydroxide solution. The yellow oil which formed was collected and crystallized from a mixture of methanol and water to give 1.0 g. of unreacted starting triazine; M.P. 63–66° C. The aqueous alkaline solution was extracted with ten 100-ml. portions of chloroform. These extracts were combined, dried, and evaporated to give a yellow oil which crystallized and was recrystallized twice from acetonitrile to give 2.0 g. of 1,2-dihydro-1-hydroxy-4-diallylamino-6-ethyl-2-imino-1,3,5-triazine in the form of light-yellow needles which gave a dark brown ferric chloride test; M.P. 108.5–110° C.

Part C.—1,2-dihydro-1-(2-propynyloxy)-4-diallylamino-6-ethyl-2-imino-1,3,5-triazine Following the procedure of Example 1, Part C, 1,2-dihydro-1-hydroxy-4-diallylamino-6-ethyl-2-imino-1,3,5-triazine (5.9 g.; 0.025 mole) was reacted with propargyl bromide (5.95 g.; 0.05 mole) to give 1,2-dihydro-1-(2-propynyloxy)-4-diallylamino-6-ethyl-2-imino-1,3,5-triazine hydrobromide. The corresponding free base was obtained by adding excess aqueous ammonia to the hydrobromide.

EXAMPLE 5

Part A.—2-amino-4-methyl-6-morpholino-1,3,5-triazine

Sodium metal (9.7 g.; 0.42 gram atom) was reacted with 300 ml. of methanol, and the mixture was added rapidly to a stirred solution of 1,1-(3-oxapentamethylene)biguanide hydrochloride (43.5 g.; 0.21 mole) in 100 ml. of methanol at 25° C. Ethyl acetate (21.1 g.; 0.24 mole) was then added to the resulting stirred mixture at 25° C. After stirring for 51 hours at 25° C., the mixture was diluted with water to 2 liters and the resulting precipitate was filtered. Additional precipitate was obtained by concentrating the filtrate first to about 1000 ml. and then to about 100 ml., cooling and filtering after each concentration. The combined precipitates were recrystallized from water to yield 25.7 g. of white, solid 2-amino-4-methyl-6-morpholino-1,3,5-triazine; M.P. 184–185° C. (sublimes slowly).

Part B.—1,2-dihydro-1-hydroxy-2-imino-6-methyl-4-morpholino-1,3,5-triazine

Following the procedure of Example 4, Part B, 2-amino-4-methyl-6-morpholino-1,3,5-triazine (4.9 g.; 0.025 mole) was oxidized with m-chloroperbenzoic acid (95% pure; 9.0 g.; 0.05 mole) in 150 ml. of absolute ethanol. The residue obtained from the combined chloroform extracts was recrystallized from acetonitrile to give 0.7 g. of 1,2-dihydro-1-hydroxy-2-imino-6-methyl-4-morpholino-1,3,5-triazine in the form of a white solid; M.P. 254–255° C.

Part C.—1,2-dihydro-1-cyclohexyloxy-2-imino-6-methyl-4-morpholino-1,3,5-triazine Following the procedure of Example 1, Part C, 1,2-dihydro-1-hydroxy-2-imino-6-methyl-4-morpholino-1,3,5-triazine (5.3 g.; 0.025 mole) was reacted with cyclohexyl bromide (8.2 g.; 0.05 mole) to give 1,2-dihydro-1-cyclohexyloxy-2-imino-6-methyl-4-morpholino-1,3,5-triazine hydrobromide. The corresponding free base was obtained by adding excess aqueous ammonia to the hydrobromide. The free base is transformed to the corresponding dihydrochloride by addition of excess hydrochloric acid to the free base followed by evaporation of the water.

EXAMPLE 6

Part A.—1,2-dihydro-1-hydroxy-2-imino-6-methyl-4-piperidino-1,3,5-triazine

Following the procedure of Example 4, Part B, 2-amino-4-methyl-6-piperidino-1,3,5-triazine was oxidized with m-chloroperbenzoic acid to give 1,2-dihydro-1-hydroxy-2-imino-6-methyl-4-piperidino-1,3,5-triazine.

Part B.—1,2-dihydro-1-allyloxy-2-amino-6-methyl-4-piperidino-1,3,5-triazine Following the procedure of Example 1, Part C, 1,2-dihydro-1-hydroxy-2-imino-6-methyl-4-piperidino-1,3,5-triazine (5.2 g.; 0.025 mole) was reacted with allyl chloride (3.8 g.; 0.05 mole) to give 1,2-dihydro-1-allyloxy-2-imino-6-methyl-4-piperidino-1,3,5-triazine hydrochloride. The corresponding free base was obtained by adding excess aqueous ammonia to the hydrochloride.

EXAMPLE 7

*Part A.—5-cyclohexyl-1,1-ethylenebiguanide*

Following the procedure of Shapiro et al., J. Am. Chem. Soc. 81, 4635–9 (1959), ethylenimine hydrochloride is fused with 3-cyclohexyl-1-cyanoguanidine to yield 5-cyclohexyl-1,1-ethylenebiguanide hydrochloride.

*Part B.—2 - (1-aziridinyl)-4-cyclohexylamino-6-methyl-1,3,5-triazine*

Following the procedure of Example 5, Part A, 5-cyclohexyl-1,1-ethylenebiguanide hydrochloride is reacted with ethyl acetate in the presence of sodium methoxide and methanol to give 1-(aziridinyl)-4-cyclohexylamino-6-methyl-1,3,5-triazine.

*Part C.—1,2-dihydro-1-hydroxy-4-(1-aziridinyl)-2-cyclohexylimino-6-methyl-1,3,5-triazine*

Following the procedure of Example 4, Part B, 2-(1-aziridinyl) - 4 - cyclohexylamino-6-methyl-1,3,5-triazine is oxidized with m-chloroperbenzoic acid to give 1,2-dihydro-1 - hydroxy-4-(1-aziridinyl)-2-cyclohexylimino-6-methyl-1,3,5-triazine.

*Part D.—1,2 - dihydro - 1-ethoxy-4-(1-aziridinyl)-2-cyclohexylimino-6-methyl-1,3,5-triazine*

Following the procedure of Example 1, Part C, 1,2-dihydro - 1-hydroxy-4-(1-aziridinyl)-2-cyclohexylimino-6-methyl-1,3,5-triazine (6.2 g.; 0.025 mole) was reacted with ethyl iodide (7.8 g.; 0.05 mole) to give 1,2-dihydro-1 - ethoxy - 4-(1-aziridinyl)-2-cyclohexylimino-6-methyl-1,3,5-triazine hydriodide. The corresponding free base was obtained by adding excess aqueous amomnia to the hydriodide.

EXAMPLE 8

*Part A.—2-amino-4-benzyl-6-diallylamino-1,3,5-triazine*

Sodium metal (9.2 g.; 0.40 gram atom) was reacted with 300 ml. of ethanol, and the mixture was added rapidly to a stirred solution of 1,1-diallylbiguanide hydrochloride (43.5 g.; 0.20 mole) in 100 ml. of ethanol at about 25° C. Ethyl phenylacetate (36.1 g.; 0.22 mole) was then added to the resulting stirred mixture at 25° C. After stirring for 54 hours at 25° C., the reaction mixture was diluted to 2000 ml. with water and cooled. The solid which precipitated was filtered and recrystallized from a mixture of methanol and water to give 28.7 g. of 2-amino-4-benzyl-6-diallylamino-1,3,5-triazine; M.P. 58–60° C.

*Part B.—1,2 - dihydro-1-hydroxy-6-benzyl-4-diallylamino-2-imino-1,3,5-triazine*

Following the procedure of Example 4, Part B, 2-amino-4-benzyl-6-diallylamino-1,3,5-triazine (7.0 g.; 0.025 mole) was oxidized with m-chloroperbenzoic acid (95% pure; 9.0 g.; 0.05 mole) in 150 ml. of absolute ethanol. There was obtained 1,2-dihydro-1-hydroxy-6-benzyl-4-diallylamino-2-imino-1,3,5-triazine in the form of an oil which did not crystallize and which gave a positive ferric chloride test.

*Part C.—1,2 - dihydro - 1 - benzyloxy-6-benzyl-4-diallylamino-2-imino-1,3,5-triazine*

Following the procedure of Example 1, Part C, 1,2-dihydro - 1-hydroxy - 6-benzyl-4-diallylamino-2-imino-1,3,5-triazine (7.4 g.; 0.025 mole) was reacted with benzyl chloride (6.3 g.; 0.05 mole) to give 1,2-dihydro-1-benzyloxy-6-benzyl - 4 - diallylamino-2-imino-1,3,5-triazine hydrochloride. The corresponding free base was obtained by adding excess aqueous ammonia to the hydrochloride. The corresponding benzoic acid salt was obtained by adding one equivalent of benzoic acid to an absolute ethanol solution of the free base, followed by addition of several volumes of diethyl ether.

EXAMPLE 9

*Part A.—2-amino-4-butyl-6-diallylamino-1,3,5-triazine*

Following the procedure of Example 8, Part A, 1,1-diallylbiguanide hydrochloride (43.5 g.; 0.20 mole) was reacted with ethyl valerate (28.6 g.; 0.22 mole) in the presence of sodium ethoxide and ethanol. A 48-hour reaction time was used. The oil which separated on dilution of the reaction mixture with water crystallized on cooling at about 5–10° C. for 4 days. This material was recrystallized from a mixture of methanol and water at 0° C. to give 35.8 g. of 2-amino-4-butyl-6-diallylamino-1,3,5-triazine in the form of white crystals; M.P. 32–34° C.

*Part B.—1,2 - dihydro-1-hydroxy-6-butyl-4-diallylamino-2-imino-1,3,5-triazine*

Following the procedure of Example 4, Part B, 2-amino-4-butyl-6-diallylamino-1,3,5-triazine (6.2 g.; 0.025 mole) was oxidized with m-chloroperbenzoic acid (95% pure; 9.0 g.; 0.05 mole). There was obtained 1.05 g. of 1,2-dihydro - 1 - hydroxy-6-butyl-4-diallylamino-2-imino-1,3,5-triazine in the form of a white solid which gave a positive ferric chloride test; M.P. 82–85° C.

*Part C.—1,2 - dihydro - 1-m-fluorobenzyloxy-6-butyl-4-diallylamino-2-imino-1,3,5-triazine*

Following the procedure of Example 1, Part C, 1,2-dihydro - 1 - hydroxy-6-butyl-4-diallylamino-2-imino-1,3,5-triazine (6.6 g.; 0.025 mole) was reacted with m-fluorobenzyl chloride (7.2 g.; 0.05 mole) to give 1,2-dihydro-1-m - fluorobenzyloxy-6-butyl-4-diallylamino-2-imino-1,3,5-triazine hydrochloride. The corresponding free base was obtained by adding excess aqueous ammonia to the hydrochloride.

EXAMPLE 10

*Part A.—2 - dimethylamino - 4-octyl-6-propylamino-1,3,5-triazine*

Following the procedure of Example 8, Part A, 1,1-dimethyl-5-propylbiguanide hydrochloride is reacted with ethyl nonanoate in the presence of sodium ethoxide and ethanol to give 2-dimethylamino-4-octyl-6-propylamino-1,3,5-triazine.

*Part B.—1,2-dihydro-1-hydroxy-4-dimethylamino-6-octyl-2-propylimino-1,3,5-triazine*

Following the procedure of Example 4, Part B, 2-dimethylamino-4-octyl-6-propylamino-1,3,5-triazine is oxidized with m-chloroperbenzoic acid to give 1,2-dihydro-1-hydroxy - 4 - dimethylamino-6-octyl-2-propylimino-1,3,5-triazine.

*Part C.—1,2-dihydro-1-allyloxy-4-dimethylamino-6-octyl-2-propylimino-1,3,5-triazine*

Following the procedure of Example 1, Part C, 1,2-dihydro - 1 - hydroxy-4-dimethylamino-6-octyl-2-propylimino-1,3,5-triazine (7.7 g.; 0.025 mole) was reacted with allyl chloride (3.8 g.; 0.05 mole) to give 1,2-dihydro-1-allyloxy - 4 - dimethylamino - 6-octyl-2-propylimino-1,3,5-triazine hydrochloride. The corresponding free base was obtained by adding excess aqueous ammonia to the hydrochloride.

EXAMPLE 11

*Part A.—2-amino-4-cyclohexyl-6-diallylamino-1,3,5-triazine*

Following the procedure of Example 8, Part A, 1,1-diallylbiguanide hydrochloride (43.5 g.; 0.20 mole) was reacted with methyl cyclohexane carboxylate (31.0 g.; 0.22 mole) in the presence of sodium ethoxide and ethanol. A 48-hour reaction time was used. The product was recrystallized from a mixture of methanol and water to give 31.9 g. of 2-amino-4-cyclohexyl-6-diallylamino-1,3,5-triazine in the form of colorless needles; M.P. 90–92° C.

Part B.—*1,2-dihydro-1-hydroxy-6-cyclohexyl-4-diallylamino-2-imino-1,3,5-triazine*

Following the procedure of Example 4, Part B, 2-amino-4-cyclohexyl-6-diallylamino-1,3,5-triazine (6.8 g.; 0.025 mole) was oxidized with m-chloroperbenzoic acid (95% pure; 9.0 g.; 0.05 mole). The oil which precipitated from the aqueous alkaline solution and the residue which remained after evaporation of the combined chloroform extracts were combined and recrystallized from acetonitrile to give 1.9 g. of 1,2-dihydro-1-hydroxy-6-cyclohexyl-4-diallylamino-2-imino-1,3,5-triazine in the form of colorless needles; M.P. 139–142° C.

Part C.—*1,2-dihydro-1-cyclohexyloxy-6-cyclohexyl-4-diallylamino-2-imino-1,3,5-triazine*

Following the procedure of Example 1, Part C, 1,2-dihydro - 1 - hydroxy - 6 - cyclohexyl - 4 - diallylamino-2-imino-1,3,5-triazine (7.2 g.; 0.025 mole) was reacted with cyclohexyl bromide (8.15 g.; 0.05 mole) to give 1,2 - dihydro - 1 - cyclohexyloxy - 6 - cyclohexyl - 4 - diallylamino - 2 - imino - 1,3,5 - triazine hydrobromide. The corresponding free base was obtained by adding excess aqueous ammonia to the hydrobromide. The corresponding phosphoric acid salt was obtained by adding one equivalent of phosphoric acid to an absolute ethanol solution of the free base followed by addition of several volumes of diethyl ether.

EXAMPLE 12

Part A.—*2-amino-4-diallylamino-6-phenyl-1,3,5-triazine*

Sodium metal (9.2 g.; 0.40 gram atom) was reacted with 200 ml. of methanol, and the mixture was added to a stirred solution of 1,1-diallylbiguanide hydrochloride (43.5 g.; 0.20 mole) in 100 ml. of methanol at about 25° C. Methyl benzoate (29.9 g.; 0.22 mole) was then added to the resulting stirred mixture at 25° C. After stirring for 53 hours at 25° C., the reaction mixture was diluted to 2000 ml. with water. The precipitate which formed was filtered and recrystallized from methanol to give 25.6 g. of 2-amino-4-diallylamino-6-phenyl-1,3,5-triazine in the form of white crystals; M.P. 82–84° C. Addition of about 1000 ml. of water to the filtrate gave an additional 6.2 g. of the same product.

Part B.—*1,2-dihydro-1-hydroxy-4-diallylamino-2-imino-6-phenyl-1,3,5-triazine*

Following the procedure of Example 4, Part B, 2-amino-4-diallylamino-6-phenyl-1,3,5-triazine (6.7 g.; 0.025 mole) was oxidized with m-chloroperbenzoic acid (95% pure; 9.0 g.; 0.05 mole). The oil which separated from the aqueous alkaline solution and the solid residue remaining after evaporation of the combined chloroform extracts were combined and recrystallized from a mixture of acetonitrile and diethyl ether to give 0.4 g. of 1,2-dihydro-1 - hydroxy - 4 - diallylamino - 2 - imino - 6 - phenyl-1,3,5-triazine in the form of yellow crystals which gave a dark brown ferric chloride test; M.P. 135–145° C.

Part C.—*1,2-dihydro-1-p-chlorobenzyloxy-4-diallylamino-2-imino-6-phenyl-1,3,5-triazine*

Following the procedure of Example 1, Part C, 1,2-dihydro - 1 - hydroxy - 4 - diallylamino - 2 - imino - 6 - phenyl-1,3,5-triazine (7.1 g.; 0.025 mole) was reacted with p-chlorobenzyl chloride (8.05 g.; 0.05 mole) to give 1,2 - dihydro - 1 - p - chlorobenzyloxy - 4 - diallylamino-2-imino-6-phenyl-1,3,5-triazine hydrochloride. The corresponding free base was obtained by adding excess aqueous ammonia to the hydrochloride.

EXAMPLE 13

Part A.—*1,2-dihydro-1-hydroxy-4-dimethylamino-2-imino-6-phenyl-1,3,5-triazine*

Following the procedure of Example 4, Part B, 2-amino - 4 - dimethylamino - 6 - phenyl - 1,3,5 - triazine was oxidized with m-chloroperbenzoic acid to give 1,2-dihydro - 1 - hydroxy - 4 - dimethylamino - 2 - imino - 6-phenyl-1,3,5-triazine.

Part B.—*1,2-dihydro-1-allyloxy-4-dimethylamino-2-imino-6-phenyl-1,3,5-triazine*

Following the procedure of Example 1, Part C, 1,2-dihydro - 1 - hydroxy - 4 - dimethylamino - 2 - imino - 6-phenyl-1,3,5-triazine (5.8 g.; 0.025 mole) was reacted with allyl chloride (3.8 g.; 0.05 mole) to give 1,2-dihydro-1 - allyloxy - 4 - dimethylamino - 2 - imino - 6 - phenyl-1,3,5-triazine hydrochloride. The corresponding free base was obtained by adding excess aqueous ammonia to the hydrochloride.

EXAMPLE 14

Part A.—*1-allyl-1-methylbiguanide hydrochloride*

Following the procedure of Shapiro et al., J. Am. Chem. Soc. 81, 3728–36 (1959), N-methylallylamine hydrochloride is fused with cyanoguanidine to give 1-allyl-1-methylbiguanide hydrochloride.

Part B.—*2-amino-4-(N-methylallylamino)-6-p-tolyl-1,3,5-triazine*

Following the procedure of Example 12, Part A, 1-allyl-1-methylbiguanide hydrochloride is reacted with methyl p-toluate in the presence of sodium methoxide and methanol to give 2-amino-4-(N-methylallylamino)-6-p-tolyl-1,3,5-triazine.

Part C.—*1,2-dihydro-1-hydroxy-2-imino-4-(N-methylallylamino)-6-p-tolyl-1,3,5-triazine*

Following the procedure of Example 4, Part B, 2-amino-4 - (N - methylallylamino) - 6 - p - tolyl - 1,3,5 - triazine is oxidized with m-chloroperbenzoic acid to give 1,2-dihydro - 1 - hydroxy - 2 - imino - 4 - (N - methylallylamino)-6-p-tolyl-1,3,5-triazine.

Part D.—*1,2-dihydro-1-methoxy-2-imino-4-(N-methylallylamino)-6-p-tolyl-1,3,5-triazine*

Following the procedure of Example 1, Part C, 1,2-dihydro - 1 - hydroxy - 2 - imino - 4 - (N - methylallylamino)-6-p-tolyl-1,3,5-triazine (6.8 g.; 0.025 mole) was reacted with methyl iodide (7.1 g.; 0.05 mole) to give 1,2-dihydro - 1 - methoxy - 2 - imino - 4 - (N - methylallylamino-6-p-tolyl-1,3,5-triazine hydriodide.

EXAMPLE 15

Part A.—*2-amino-4-diallylamino-6-(2-methoxyethyl)-1,3,5-triazine*

Sodium metal (13.8 g.; 0.60 gram atom) was reacted with 300 ml. of methanol, and the mixture was added to a stirred solution of 1,1-diallylbiguanide hydrochloride (65.3 g.; 0.30 mole) in 200 ml. of methanol at about 25° C. Methyl acrylate (30.1 g.; 0.35 mole) was then added to the resulting stirred mixture at 25° C. After stirring for 72 hours at 25° C., the reaction mixture was diluted to 2000 ml. with water. The oil which separated did not crystallize, and was extracted with five 200-ml. portions of methylene chloride. The combined extracts were washed with water, dried, and evaporated to give an oily residue which was distilled at reduced pressure to give 47.0 g. of 2-amino-4-diallylamino-6-(2-methoxyethyl)-1,3-triazine in the form of a colorless viscous oil; B.P. 144–160° C. at 0.2 to 0.7 mm.

Part B.—*1,2-dihydro-1-hydroxy-4-diallylamino-2-imino-6-(2-methoxyethyl)-1,3,5-triazine*

Finely-divided m-chloroperbenzoic acid (91.5% pure; 11.3 g.; 0.06 mole) was added gradually during 20 minutes to a stirred solution of 2-amino-4-diallylamino-6-(2-methoxyethyl)-1,3,5-triazine (7.5 g.; 0.03 mole) in 350 ml. of absolute ethanol at 5° C. The resulting reaction mixture was stirred 8 hours at 0–5° C. and 15 hours while rising gradually to 25° C. At this point, a starch-iodide test for peracids was negative. Solvent was removed at reduced pressure to give a white solid to which was added a solution of 10 ml. of concentrated hydrochloric acid in 200 ml. of water. This mixture was filtered. The filter cake was washed with water, and the combined filtrate and washings were adjusted to pH 9 with aqueous sodium hydroxide solution. The yellow oil which formed was allowed to settle for 4 hours. The alkaline aqueous layer was decanted and extracted repeatedly with chloroform until a portion of a fresh extract did not give a dark color to ethanolic ferric chloride. The combined extracts were dried with sodium sulfate and evaporated to give a yellow oil which was crystallized from acetonitrile to give 3.75 g. of 1,2-dihydro-1-hydroxy-4-diallylamino-2-imino-6 - (2-methoxyethyl)-1,3,5-triazine in the form of a light-yellow solid which gave a dark brown color to ethanolic ferric chloride; M.P. 132–134° C.

*Part C.—1,2-dihydro-1-p-methoxybenzyloxy-4-diallylamino-2-imino-6-(2-methoxyethyl)-1,3,5-triazine*

Following the procedure of Example 1, Part C, 1,2-dihydro-1-hydroxy-4-diallylamino-2-imino-6-(2 - methoxyethyl)-1,3,5-triazine (6.6 g.; 0.025 mole) was reacted with p-methoxybenzyl chloride (7.8 g.; 0.05 mole) to give 1,2-dihydro-1-p-methoxybenzyloxy-4-diallylamino-2 - imino-6-(2-methoxyethyl)-1,3,5 - triazine hydrochloride. The corresponding free base was obtained by adding excess aqueous ammonia to the hydrochloride. Addition of one equivalent of lactic acid to an absolute ethanol solution of the free base, followed by addition of several volumes of diethyl ether, gave the corresponding lactic acid addition salt.

EXAMPLE 16

*Part A.—2-amino-4-diallylamino-6-(2-methoxypropyl)-1,3,5-triazine*

Following the procedure of Example 15, Part A, 1,1-diallylbiguanide hydrochloride (43.5 g.; 0.20 mole) was reacted with methyl crotonate (22.0 g.; 0.22 mole) in the presence of sodium methoxide and methanol. Distillation of the product gave 34.8 g. of 2-amino-4-diallylamino-6-(2-methoxypropyl)-1,3,5-triazine in the form of a colorless viscous oil; B.P. 145–147° C. at 0.25 to 0.40 mm.

*Part B.—1,2-dihydro-1-hydroxy-4-diallylamino-2-imino-6-(2-methoxypropyl)-1,3,5-triazine*

Following the procedure of Example 15, Part B, 2-amino-4-diallylamino-6-(2-methoxypropyl)-1,3,5 - triazine (10.5 g.; 0.04 mole) was oxidized with m-chloroperbenzoic acid (91.5% pure; 15.1 g.; 0.08 mole) to give 1,2-dihydro-1-hydroxy-4-diallylamino-2-imino-6-(2 - methoxypropyl)-1,3,5-triazine in the form of an oil which gave a positive ferric chloride test and which did not crystallize.

*Part C.—1,2-dihydro-1-(1-phenylethoxy)-4-diallylamino-2-imino-6-(2-methoxypropyl)-1,3,5-triazine*

Following the procedure of Example 1, Part C, 1,2-dihydro-1-hydroxy-4-diallylamino-2-imino-6-(2 - methoxypropyl)-1,3,5-triazine (6.0 g.; 0.025 mole) was reacted with 1-phenylethyl chloride (7.0 g.; 0.05 mole) to give 1,2-dihydro-1-(1-phenylethoxy)-4-diallylamino-2-imino - 6-(2-methoxypropyl)-1,3,5-triazine hydrochloride. The corresponding free base was obtained by adding excess aqueous ammonia to the hydrochloride.

EXAMPLE 17

*Part A.—2-amino-4-diallylamino-6-vinyl-1,3,5-triazine*

Sodium metal (9.2 g.; 0.40 gram atom) was reacted with 500 ml. of ethylene glycol monomethyl ether. To this mixture was added 1,1-diallylbiguanide hydrochloride (87.0 g.; 0.40 mole). The sodium chloride which precipitated was filtered. Methyl acrylate (34.4 g.; 0.40 mole) was added with stirring to this filtrate at 25° C. After stirring for an additional 63 hours at 25° C., the reaction mixture was concentrated at reduced pressure to about one-half its original volume and was then diluted with ice-water to 2000 ml. The oil which separated was extracted with four 250-ml. portions of methylene chloride, and the combined extracts were dried with sodium sulfate and evaporated. The oily residue was distilled at reduced pressure. The fraction which distilled at 138° to 168° C. at 0.45 to 1.0 mm. was collected separately. This fraction solidified and was recrystallized from a mixture of methanol and water to give 14.9 g. of 2-amino-4-diallylamino-6-vinyl-1,3,5-triazine in the form of a white solid; M.P. 64–65° C.

*Part B.—1,2-dihydro-1-hydroxy-4-diallylamino-2-imino-6-vinyl-1,3,5-triazine*

Following the procedure of Example 15, Part B, 2-amino-4-diallylamino-6-vinyl-1,3,5-triazine (8.7 g.; 0.04 mole) was oxidized with m-chloroperbenzoic acid (91.5% pure; 15.1 g.; 0.08 mole). The oil which separated from the alkaline aqueous solution and the oil remaining after evaporation of the combined chloroform extracts were combined and adsorbed on a column of Florisil (60–100 mesh; a magnesium trisilicate; obtained from the Floridin Company, Tallahassee, Florida). After chloroform elution of 0.85 g. of starting triazine, elution with a mixture of equal volumes of methanol and chloroform followed by evaporation of the eluate gave 4.5 g. of 1,2-dihydro-1-hydroxy-4-diallylamino-2-imino-6-vinyl-1,3,5-triazine in the form of a viscous yellow oil which gave a dark brown color to alcoholic ferric chloride and which did not crystallize.

*Part C.—1,2-dihydro-1-ethoxy-4-diallylamino-2-imino-6-vinyl-1,3,5-triazine*

Following the procedure of Example 1, Part C, 1,2-dihydro - 1 - hydroxy-4-diallylamino-2-imino-6-vinyl-1,3,5-triazine (5.8 g.; 0.025 mole) was reacted with ethyl iodide (7.8 g.; 0.05 mole) to give 1,2-dihydro-1-ethoxy-4-diallylamino-2-imino-6-vinyl-1,3,5-triazine hydriodide. The corresponding free base was obtained by adding excess aqueous ammonia to the hydriodide.

EXAMPLE 18

*Part A.—2-allyl-4-amino-6-(2-methylpiperidino)-1,3,5-triazine*

Following the procedure of Example 17, Part A, 1,1-(1-methylpentamethylene)biguanide hydrochloride is reacted with methyl 3-butenoate to give 2-allyl-4-amino-6-(2-methylpiperidino)-1,3,5-triazine.

*Part B.—1,2-dihydro-1-hydroxy-6-allyl-2-imino-4-(2-methylpiperidino)-1,3,5-triazine*

Following the procedure of Example 15, Part B, 2-allyl-4-amino-6-(2-methylpiperidino)-1,3,5-triazine is oxidized with m-chloroperbenzoic acid to give 1,2-dihydro-1-hydroxy-6-allyl-2-imino-4-(2 - methylpiperidino) - 1,3,5-triazine.

*Part C.—1,2-dihydro-1-allyloxy-6-allyl-2-imino-4-(2-methylpiperidino)-1,3,5-triazine*

Following the procedure of Example 1, Part C, 1,2-dihydro-1-hydroxy - 6 - allyl - 2 - imino - 4 - (2 - methylpiperidino)-1,3,5-triazine (6.2 g.; 0.025 mole) was reacted with allyl chloride (3.8 g.; 0.05 mole) to give 1,2-dihydro - 1 - allyloxy - 6 - allyl - 2 - imino-4-(2-methylpiperidino) - 1,3,5 - triazine hydrochloride. The corresponding free base was obtained by adding excess aqueous ammonia to the hydrochloride.

EXAMPLE 19

*Part A.—2-amino-4-diallylamino-6-propyl-1,3,5-triazine*

Sodium metal (9.2 g.; 0.40 gram atom) was reacted with 200 ml. of methanol, and the mixture was added to a stirred solution of 1,1-diallylbiguanide hydrochloride (43.5 g.; 0.20 mole) in 100 ml. of methanol at about 25° C. Methyl butyrate (22.5 g.; 0.22 mole) was then added to the resulting stirred mixture at 25° C. After stirring for 69 hours at 25° C., the reaction mixture was poured into 1500 ml. of water at 0° C. The solid which precipitated was filtered and recrystallized from a mixture of methanol and water to give 33.2 g. of 2-amino-4-diallylamino-6-propyl-1,3,5-triazine in the form of white crystals; M.P. 50–52° C.

*Part B.—1,2-dihydro-1-hydroxy-4-diallylamino-2-imino-6-propyl-1,3,5-triazine.*

Following the procedure of Example 15, Part B, 2-amino-4-diallylamino-6-propyl-1,3,5-triazine (9.3 g.; 0.04 mole) was oxidized with m-chloroperbenzoic acid (91.5% pure; 15.1 g.; 0.08 mole). The oil which separated from the aqueous alkaline solution and the material which remained after evaporation of the combined chloroform extracts were combined and crystallized from acetonitrile to give 2.8 g. of 1,2-dihydro-1-hydroxy-4-diallylamino-2-imino-6-propyl-1,3,5-triazine in the form of a white solid which gave a dark brown color to ethanolic ferric chloride; M.P. 88–91° C.

*Part C.—1,2-dihydro-1-cyclopentyloxy-4-diallylamino-2-imino-6-propyl-1,3,5-triazine*

Following the procedure of Example 1, Part C, 1,2-dihydro-1-hydroxy-4-diallylamino - 2 - imino - 6 - propyl-1,3,5-triazine (6.2 g.; 0.025 mole) was reacted with cyclopentyl bromide (7.45 g.; 0.05 mole) to give 1,2-dihydro-1-cyclopentyloxy-4-diallylamino-2-imino-6-propyl - 1,3,5-triazine hydrobromide. The corresponding free base was obtained by adding excess aqueous ammonia to the hydrobromide.

EXAMPLE 20

*Part A.—2-amino-4-diallylamino-6-isopropyl-1,3,5-triazine*

Following the procedure of Example 19, Part A, 1,1-diallylbiguanide hydrochloride (43.5 g.; 0.20 mole) was reacted with methyl isobutyrate (22.5 g.; 0.22 mole). A 46-hour reaction time at 25° C. was used. The reaction product was recrystallized from a mixture of ethanol and water to give 26.4 g. of 2-amino-4-diallylamino-6-isopropyl-1,3,5-triazine in the form of a white solid; M.P. 49–51° C.

*Part B.—1,2-dihydro-1-hydroxy-4-diallylamino-2-imino-6-isopropyl-1,3,5-triazine*

Following the procedure of Example 15, Part B, 2-amino-4-diallylamino-6-isopropyl - 1,3,5 - triazine (9.3 g.; 0.04 mole) was oxidized with m-chloroperbenzoic acid (46% pure; 30.0 g.; 0.08 mole). The reaction product was recrystallized twice from acetonitrile to give 1.2 g. of 1,2 - dihydro-1-hydroxy-4-diallylamino-2-imino-6-isopropyl-1,3,5-triazine in the form of white crystals which gave a positive ferric chloride test; M.P. 119–121° C.

*Part C.—1,2-dihydro-1-isopropoxy-4-diallylamino-2-imino-6-isopropyl-1,3,5-triazine*

Following the procedure of Example 1, Part C, 1,2-dihydro-1-hydroxy-4-diallylamino-2-imino - 6 - isopropyl-1,3,5-triazine (6.2 g.; 0.025 mole) was reacted with isopropyl iodide (8.5 g.; 0.05 mole) to give 1,2-dihydro-1-isopropoxy-4-diallylamino-2-imino - 6 - isopropyl - 1,3,5-triazine hydriodide. The corresponding free base was obtained by adding excess aqueous ammonia to the hydriodide.

EXAMPLE 21

*Part A.—2-amino-4-diallylamino-6-pentyl-1,3,5-triazine*

Following the procedure of Example 19, Part A, 1,1-diallylbiguanide hydrochloride (43.5 g.; 0.20 mole) was reacted with ethyl hexanoate (31.7 g.; 0.22 mole). A 70-hour reaction time was used. When the reaction mixture was poured into water, the product separated as an oil which did not crystallize. This oil was extracted with 1000 ml. of methylene chloride in several portions. The combined extracts were dried with sodium sulfate. Evaporation of the solvent gave a viscous residue which was distilled under reduced pressure to give 35.3 g. of 2-amino-4-diallylamino-6-pentyl-1,3,5-triazine in the form of a colorless viscous oil; B.P. 155–157° C. at 1 mm.

*Part B.—1,2 - dihydro-1-hydroxy-4-diallylamino-2-imino-6-pentyl-1,3,5-triazine*

Following the procedure of Example 15, Part B, 2-amino-4-diallylamino-6-pentyl-1,3,5-triazine (10.45 g.; 0.04 mole) was oxidized with m-chloroperbenzoic acid (91.5% pure; 15.1 g.; 0.08 mole) in a mixture of 200 ml. of absolute ethanol and 100 ml. of methanol. There was obtained from the chloroform extracts, 1.3 g. of 1,2-dihydro-1-hydroxy-4-diallylamino-2 - imino - 6 - pentyl-1,3,5-triazine in the form of a yellow oil which gave a dark brown color to ethanolic ferric chloride and which did not crystallize.

*Part C.—1,2-dihydro-1-pentyloxy-4-diallylamino-2-imino-6-pentyl-1,3,5-triazine*

Following the procedure of Example 1, Part C, 1,2-dihydro-1-hydroxy-4-diallylamino-2-imino - 6 - pentyl-1,3,5-triazine (6.9 g.; 0.025 mole) was reacted with pentyl bromide (7.55 g.; 0.05 mole) to give 1,2-dihydro-1-pentyloxy-4-diallylamino-2-imino-6-pentyl-1,3,5 - triazine hydrobromide. The corresponding free base was obtained by adding excess aqueous ammonia to the hydrobromide. Addition of one equivalent of salicylic acid to an absolute ethanol solution of the free base followed by addition of several volumes of diethyl ether gave the corresponding salicylic acid addition salt.

EXAMPLE 22

*Part A.—2-amino-4-p-chlorobenzyl-6-diallylamino-1,3,5-triazine*

Sodium metal (11.5 g.; 0.50 gram atom) was reacted with 350 ml. of methanol, and the mixture was added rapidly to a stirred solution of 1,1-diallylbiguanide hydrochloride (50.5 g.; 0.25 mole) in 100 ml. of methanol at about 25° C. Methyl p-chlorophenylacetate (50.6 g.; 0.27 mole) was then added to the resulting stirred mixture at 25° C. After stirring for 111 hours at 25° C., the reaction mixture was diluted to 2000 ml. with water. The solid which precipitated was filtered and recrystallized from a mixture of methanol and water to give 53.3 g. of 2-amino-4-p-chlorobenzyl-6-diallylamino-1,3,5-triazine in the form of colorless needles; M.P. 87–89° C.

*Part B.—1,2-dihydro-1-hydroxy-6-p-chlorobenzyl-4-diallylamino-2-imino-1,3,5-triazine*

Following the procedure of Example 15, Part B, 2-amino-4-p-chlorobenzyl-6 - diallylamino - 1,3,5 - triazine (12.6 g.; 0.04 mole) was oxidized with m-chloroperbenzoic acid (91.5% pure; 15.1 g.; 0.08 mole) in a mixture of 300 ml. of absolute ethanol and 250 ml. of methanol. The initial white solid reaction product was treated four times with a mixture of water and concentrated hydrochloric acid rather than only once, being filtered and washed with water after each treatment. Each aqueous acidic filtrate was combined with the corresponding washing and adjusted to pH 9 with aqueous sodium hydroxide solution. In each case, the yellow oil which formed was allowed to settle for four hours. Aqueous layers were decanted and each was extracted repeatedly with chloroform. All chloroform extracts were dried and evaporated to give a residue which was combined with all other portions of yellow oil, the whole being dissolved in about 30 ml. of chloroform. This chloroform solution was dried and adsorbed on a column of Florisil (60–100 mesh). After chloroform elution of unreacted starting triazine, elution with a mixture of equal volumes of methanol and chloroform followed by evaporation of the eluate gave 4.45 g. of 1,2-dihydro- 1-hydroxy-6-p-chlorobenzyl-4-diallylamino-2-imino - 1,3, 5-triazine in the form of an amorphous yellow solid which did not crystallize from the usual crystallization solvents; M.P. 65–80° C.

*Part C.—1,2-dihydro-1-p-chlorobenzyloxy-6 - p - chlorobenzyl-4-diallylamino-2-imino-1,3,5-triazine*

Following the procedure of Example 1, Part C, 1,2-dihydro-1-hydroxy-6-p-chlorobenzyl - 4 - diallylamino-2-imino-1,3,5-triazine (8.3 g.; 0.025 mole) was reacted with p-chlorobenzyl chloride (8.05 g.; 0.05 mole) to give 1,2-dihydro-1-p-chlorobenzyloxy - 6 - p - chlorobenzyl-4-diallylamino-2-imino-1,3,5-triazine hydrochloride. The corresponding free base was obtained by adding excess aqueous ammonia to the hydrochloride.

EXAMPLE 23

*Part A.—2-amino-4-p-methylbenzyl-6-(1-pyrrolidinyl)-1, 3,5-triazine*

Following the procedure of Example 22, Part A, 1,1-tetramethylenebiguanide hydrochloride is reacted with methyl p-methylphenylacetate in the presence of sodium methoxide and methanol to give 2-amino-4-p-methylbenzyl-6-(1-pyrrolidinyl)-1,3,5-triazine.

*Part B.—1,2-dihydro-1-hydroxy-2-imino-6-p-methylbenzyl-4-(1-pyrrolidinyl)-1,3,5-triazine*

Following the procedure of Example 15, Part B, 2-amino-4-p-methylbenzyl-6 - (1-pyrrolidinyl) - 1,3,5 - triazine is oxidized with m-chloroperbenzoic acid to give 1,2-dihydro-1-hydroxy-2-imino-6-p-methylbenzyl - 4 - (1-pyrrolidinyl)-1,3,5-triazine.

*Part C.—1,2-dihydro-1-m-methylbenzyloxy-2-imino-6-p-methylbenzyl-4-(1-pyrrolidinyl)-1,3,5-triazine*

Following the procedure of Example 1, Part C, 1,2-dihydro-1-hydroxy-2-imino-6-p-methylbenzyl - 4 - (1-pyrrolidinyl)-1,3,5-triazine (7.1 g.; 0.025 mole) was reacted with m-methylbenzyl chloride (7.0 g.; 0.05 mole) to give 1,2-dihydro-1-m-methylbenzyloxy-2-imino-6-p-methylbenzyl-4-(1-pyrrolidinyl) - 1,3,5-triazine hydrochloride. The corresponding free base was obtained by adding excess aqueous ammonia to the hydrochloride.

EXAMPLE 24

*Part A.—2-amino-4-(1-hexahydroazepinyl)-6-p-methoxybenzyl-1,3,5-triazine*

Following the procedure of Example 22, Part A, 1,1-hexamethylenebiguanide hydrochloride is reacted with methyl p-methoxyphenylacetate in the presence of sodium methoxide and methanol to give 2-amino-4-(1-hexahydroazepinyl)-6-p-methoxybenzyl-1,3,5-triazine.

*Part B.—1,2-dihydro-1-hydroxy-4-(1-hexahydroazepinyl)-2-imino-6-p-methoxybenzyl-1,3,5-triazine*

Following the procedure of Example 15, Part B, 2-amino-4 - (1 - hexahydroazepinyl) - 6-p-methoxybenzyl-1,3,5-triazine is oxidized with m-chloroperbenzoic acid to give 1,2-dihydro-1-hydroxy-4-(1-hexahydroazepinyl)-2-imino-6-p-methoxybenzyl-1,3,5-triazine.

*Part C.—1,2-dihydro-1-allyloxy-4-(1-hexahydroazepinyl)-2-imino-6-p-methoxybenzyl-1,3,5-triazine*

Following the procedure of Example 1, Part C, 1,2-dihydro-1-hydroxy-4 - (1-hexahydoazepinyl) - 2-imino-6-methoxybenzyl-1,3,5-triazine (7.8 g.; 0.025 mole) was reacted with allyl chloride (3.8 g.; 0.05 mole) to give 1,2-dihydro-1-allyloxy-4 - (1-hexahydroazepinyl)-2-imino-6-p-methoxybenzyl-1,3,5-triazine hydrochloride. The corresponding free base was obtained by adding excess aqueous ammonia to the hydrochloride.

EXAMPLE 25

*Part A.—2-amino-4-diallylamino-6-phenethyl-1,3,5-triazine*

Following the procedure of Example 19, Part A, 1,1-diallylbiguanide hydrochloride (43.5 g.; 0.20 mole) was reacted with methyl 3-phenylpropionate (36.1 g.; 0.22 mole). A 45-hour reaction time was used. The oil which formed when the reaction mixture was poured into water did not crystallize and was extracted with four 250-ml. portions of methylene chloride. The combined extracts were dried with sodium sulfate and evaporated to give a viscous residue which was distilled under reduced pressure to give 37.8 g. of 2-amino-4-diallylamino-6-phenethyl-1,3,5-triazine in the form of a viscous liquid; B.P. 180–182° C. at 0.3 mm.

*Part B.—1,2-dihydro-1-hydroxy-4-diallylamino-2-imino-6-phenethyl-1,3,5-triazine*

Finely-divided m-chloroperbenzoic acid (91.5% pure; 15.1 g.; 0.08 mole) was added gradually during 20 minutes to a stirred solution of 2-amino-4-diallylamino-6-phenethyl-1,3,5-triazine (11.8 g.; 0.04 mole) in 150 ml. of absolute ethanol at 5° C. The resulting reaction mixture was stirred 7 hours at 0–5° C. Solvent was then removed at reduced pressure and 100 ml. of water was added to the residue. The mixture was made alkaline with aqueous sodium hydroxide solution and extracted with five 50-ml. portions of chloroform. The combined extracts were dried with sodium sulfate and evaporated. Trituration of the residue with acetonitrile produced a solid which was recrystallized from acetonitrile to give 6.15 g. of 1,2-dihydro-1-hydroxy-4-diallylamino-2-imino-6-phenethyl-1,3,5-triazine in the form of white needles which gave a dark brown color to ethanolic ferric chloride; M.P. 118–120° C.

*Part C.—1,2-dihydro-1-phenethoxy-4-diallylamino-2-imino-6-phenethyl-1,3,5-triazine*

Following the procedure of Example 1, Part C, 1,2-dihydro-1 - hydroxy-4-diallylamino-2-imino-6 - phenethyl-1,3,5-triazine (7.8 g.; 0.025 mole) was reacted with phenethyl bromide (9.25 g.; 0.05 mole) to give 1,2-dihydro-1-phenethoxy-4 - diallylamino-2-imino-6-phenethyl - 1,3,5-triazine hydrobromide. The corresponding free base was obtained by adding excess aqueous ammonia to the hydrobromide. A solution of 1,2-dihydro-1-phenethoxy-4-diallylamino-2-imino-6-phenethyl-1,3,5-triazine in water containing one equivalent of hydrochloric acid (about 1% hydrochloric acid) gives the monohydrochloride when evaporated to dryness. Similar use of 2 equivalents of hydrochloric acid gives the dihydrochloride. Similar use of one molecular amount of sulfuric acid gives the monosulfuric acid addition salt.

EXAMPLE 26

*Part A.—2-amino-4-diallylamino-6-(3-phenylpropyl)-1,3,5-triazine*

Following the procedure of Example 19, Part A, 1,1-diallylbiguanide (43.5 g.; 0.20 mole) was reacted with methyl-4-phenylbutyrate (39.2 g.; 0.22 mole). A 48-hour reaction time was used. The reaction product was recrystallized from hexane to give two crops (16.85 g. total) of 2-amino-4-diallylamino-6-(3-phenylpropyl)-1,3,5-triazine in the form of yellow crystals; M.P. 57–60° C.

*Part B.—1,2-dihydro-1-hydroxy-4-diallylamino-2-imino-6-(3-phenylpropyl)-1,3,5-triazine*

Following the procedure of Example 25, Part B, 2-amino-4 - diallylamino-6-(3-phenylpropyl) - 1,3,5-triazine (10.15 g.; 0.033 mole) was oxidized with m-chloroperbenzoic acid (91.5% pure; 12.4 g.; 0.066 mole). The reaction mixture was stirred for an additional 60 hours at 25° C. The reaction product was an oil which did not crystallize. The oil was dissolved in chloroform and adsorbed on a column of Florisil (60–100 mesh). After elution of 1.4 g. of unreacted starting triazine with 100 ml. of chloroform, further elution first with 3000 ml. of chloroform and then with 500 ml. of chloroform containing 20% by volume of methanol gave eluates which were combined and evaporated. The resulting residue was recrystallized twice from acetonitrile to give 3.2 g. of 1,2-dihydro-1-hydroxy-4-diallylamino - 2-imino-6-(3-phenylpropyl)-1,3,5-triazine in the form of a white solid which gave a dark brown color to ethanolic ferric chloride; M.P. 91–93° C.

*Part C.—1,2-dihydro-1-allyloxy-4-diallylamino-2-imino-6-(3-phenylpropyl)-1,3,5-triazine*

Following the procedure of Example 1, Part C, 1,2-dihydro-1-hydroxy-4 - diallylamino-2-imino - 6-(3-phenylpropyl)-1,3,5-triazine (8.1 g.; 0.025 mole) was reacted with allyl chloride (3.8 g.; 0.05 mole) to give 1,2-dihydro-1-allyloxy - 4-diallylamino-2-imino-6 - (3-phenylpropyl)-1,3,5-triazine hydrochloride. The corresponding free base was obtained by adding excess aqueous ammonia to the hydrochloride.

EXAMPLE 27

*Part A.—2-amino-4-cyclopropyl-6-diallylamino-1,3,5-triazine*

Following the procedure of Example 19, Part A, 1,1-diallylbiguanide hydrochloride (52.2 g.; 0.24 mole) was reacted with methyl cyclopropanecarboxylate (26.0 g.; 0.26 mole). A 42-hour reaction time was used. The reaction product was recrystallized from a mixture of ethanol and water to give 26.2 g. of 2-amino-4-cyclopropyl-6-diallylamino-1,3,5-triazine in the form of a white solid; M.P. 55–57.5° C.

*Part B.—1,2-dihydro-1-hydroxy-6-cyclopropyl-4-diallylamino-2-imino-1,3,5-triazine*

Following the procedure of Example 25, Part B, 2-amino-4-cyclopropyl-6-diallylamino-1,3,5-triazine (9.25 g.; 0.04 mole) was oxidized with m-chloroperbenzoic acid (54% pure; 25.5 g.; 0.08 mole) in 250 ml. of absolute ethanol. After a 7-hour reaction period at 0–5° C., sodium methoxide (4.05 g.; 0.075 mole) was added and the reaction mixture was stirred for an additional 15 hours at 25° C. Solvent was then removed at reduced pressure and 100 ml. of water was added to the residue. Solid unreacted starting triazine (5.45 g.) was removed by filtration, and the filtrate was extracted with chloroform as in Example 25, Part B. The residue obtained by evaporation of the combined chloroform extracts was recrystallized four times from acetonitrile to give 0.6 g. of 1,2-dihydro - 1 - hydroxy - 6 - cyclopropyl - 4 - diallylamino-2-imino-1,3,5-triazine in the form of a white solid which gave a positive ferric chloride test; M.P. 104–106° C. (sintered at 102° C.).

*Part C.—1,2-dihydro-1-cyclopropoxy-6-cyclopropyl-4-diallylamino-2-imino-1,3,5-triazine*

Following the procedure of Example 1, Part C, 1,2-dihydro - 1 - hydroxy - 6 - cyclopropyl - 4 - diallylamino - 2-imino-1,3,5-triazine (6.2 g.; 0.025 mole) was reacted with cyclopropyl bromide (6.05 g.; 0.05 mole) to give 1,2-dihydro - 1 - cyclopropoxy - 6 - cyclopropyl - 4 - diallylamino-2-imino-1,3,5-triazine hydrobromide. The corresponding free base was obtained by adding excess aqueous ammonia to the hydrobromide.

EXAMPLE 28

*Part A.—2-allylamino-4-chloro-6-methyl-1,3,5-triazine*

A solution of 2,4-dichloro-6-methyl-1,3,5-triazine (16.4 g.; 0.10 mole) in 125 ml. of diethyl ether was added to a stirred solution of allylamine (11.4 g.; 0.20 mole) in 225 ml. of diethyl ether during 90 minutes at 0–5° C. The resulting precipitate of allylamine hydrochloride was filtered, and solvent was removed from the filtrate at reduced pressure. The oily residue was crystallized from hexane, thereby separating 13.4 g. of solid product from unreacted starting triazine. This product was recrystallized from hexane to give 11.9 g. of 2-allylamino-4-chloro-6-methyl-1,3,5-triazine; M.P. 53–56° C.

*Part B.—2-allylamino-4-diallylamino-6-methyl-1,3,5-triazine*

A solution of diallylamine (9.7 g.; 0.10 mole) in 50 ml. of dimethylformamide was added to a solution of 2-allylamino-4-chloro-6-methyl-1,3,5-triazine (9.2 g.; 0.05 mole) in 50 ml. of dimethylformamide at about 25° C. The mixture was heated at 100° C. for 2 hours, and was then cooled to about 30° C. and diluted to 500 ml. with water. The solid which precipitated was filtered, and was twice dissolved in ethanol and precipitated with water to give 9.0 g. of 2-allylamino-4-diallylamino-6-methyl-1,3,5-triazine; M.P. 40–41.5° C.

*Part C.—1,2-dihydro-1-hydroxy-2-allylimino-4-diallylamino-6-methyl-1,3,5-triazine*

Following the procedure of Example 25, Part B, 2-allylamino-4-diallylamino-6-methyl-1,3,5-triazine (6.1 g.; 0.025 mole) was oxidized with m-chloroperbenzoic acid (91.5% pure; 9.4 g.; 0.05 mole) in 100 ml. of absolute ethanol. The reaction mixture was stirred for an additional 15 hours at 25° C. The reaction product was recrystallized twice from hexane to give 3.3 g. of 1,2-dihydro-1-hydroxy-2-allylimino-4-diallylamino-6-methyl-1,3,5-triazine in the form of a white solid which gave a reddish-brown color to ethanolic ferric chloride; M.P. 78–80° C. (sintered at 72° C.).

*Part D.—1,2-dihydro-1-methoxy-2-allylimino-4-diallylamino-6-methyl-1,3,5-triazine*

Following the procedure of Example 1, Part C, 1,2-dihydro - 1 - hydroxy - 2 - allylimino - 4 - diallylamino - 6-methyl-1,3,5-triazine (6.5 g.; 0.025 mole) was reacted with methyl iodide (7.1 g.; 0.05 mole) to give 1,2-dihydro - 1 - methoxy - 2 - allylimino - 4 - diallylamino - 6-methyl-1,3,5-triazine hydriodide. The corresponding free base was obtained by adding excess aqueous ammonia to the hydriodide.

EXAMPLE 29

*Part A.—2-anilino-4-chloro-6-methyl-1,3,5-triazine*

Following the procedure of Example 28, Part A, 2,4-dichloro-6-methyl-1,3,5-triazine (16.4 g.; 0.10 mole) was reacted with aniline (18.6 g.; 0.20 mole) in 300 ml. of diethyl ether. There was obtained 23.4 g. of 2-anilino-4-chloro-6-methyl-1,3,5-triazine in the form of an off-white solid; M.P. 100–115° C. This material was not purified but was used directly in Part B below.

*Part B.—2-anilino-4-diallylamino-6-methyl-1,3,5-triazine*

Following the procedure of Example 28, Part B, 2-anilino - 4 - chloro - 6-methyl-1,3,5-triazine (11.0 g.; 0.05 mole) was reacted with diallylamine (9.7 g.; 0.10 mole). The product was isolated from the water-diluted reaction mixture by extraction with four 200-ml. portions of chloroform. The combined extracts were washed twice with 100-ml. portions of water, and were dried with sodium sulfate. Evaporation of solvent and distillation of the residue at reduced pressure gave 10.7 g. of 2-anilino-4-diallylamino-6-methyl-1,3,5-triazine as a viscous yellow oil; B.P. 180–195° C. at 1.1 mm.

*Part C.—1,2-dihydro-1-hydroxy-4-diallylamino-6-methyl-2-phenylimino-1,3,5-triazine*

Following the procedure of Example 25, Part B, 2-anilino-4-diallylamino-6-methyl-1,3,5-triazine (10.5 g.; 0.037 mole) was oxidized with m-chloroperbenzoic acid (91.5% pure; 14.0 g.; 0.074 mole) in a mixture of 100 ml. of absolute ethanol and 100 ml. of methanol. The reaction mixture was stirred for an additional 15 hours at 25° C. The reaction product was recrystallized twice from hexane to give 2.1 g. of 1,2-dihydro-1-hydroxy-4-diallylamino-6-methyl-2-phenylimino-1,3,5-triazine in the form of tan needles which gave a dark brown ferric chloride test; M.P. 103–105° C.

*Part D.—1,2-dihydro-1-methoxy-4-diallylamino-6-methyl-2-phenylimino-1,3,5-triazine.*

Following the procedure of Example 1, Part C, 1,2-dihydro - 1 - hydroxy-4-diallylamino-6-methyl-2-phenylimino-1,3,5-triazine (7.4 g.; 0.025 mole) was reacted with methyl iodide (7.1 g.; 0.05 mole) to give 1,2-dihydro - 1 - methoxy-4-diallylamino-6-methyl-2-phenylimino-1,3,5-triazine hydriodide. The corresponding free base was obtained by adding excess aqueous ammonia to the hydriodide.

EXAMPLE 30

*Part A.—2-benzylamino-4-chloro-6-methyl-1,3,5-triazine*

Following the procedure of Example 28, Part A, 2,4-dichloro-6-methyl-1,3,5-triazine (16.4 g.; 0.10 mole) was reacted with benzylamine (21.45 g.; 0.02 mole) in 400 ml. of diethyl ether. Crystallization of the product from 500 ml. of hexane gave 17.55 g. of 2-benzylamino-4-chloro-6-methyl-1,3,5-triazine in the form of light-yellow needles; M.P. 98–100° C. (sintered at 95° C.).

*Part B.—2-benzylamino-4-diallylamino-6-methyl-1,3,5-triazine*

Following the procedure of Example 28, Part B, 2-benzylamino-4-chloro-6-methyl-1,3,5-triazine (11.7 g.; 0.05 mole) was reacted with diallylamine (9.7 g.; 0.10 mole). The solid which precipitated from the water-diluted reaction mixture was filtered and recrystallized from hexane to give 10.9 g. of 2-benzylamino-4-diallylamino-6-methyl-1,3,5-triazine in the form of off-white needles; M.P. 67–69° C.

*Part C.—1,2-dihydro-1-hydroxy-2-benzylimino-4-diallylamino-6-methyl-1,3,5-triazine*

Following the procedure of Example 25, Part B, 2-benzylamino-4-diallylamino-6-methyl-1,3,5-triazine (7.4 g.; 0.025 mole) was oxidized with m-chloroperbenzoic acid (91.5% pure; 9.4 g.; 0.05 mole). The reaction mixture was stirred for an additional 15 hours at 25° C. Solvent was removed, and the reaction residue was treated with water and aqueous sodium hydroxide solution. The solid which precipitated was filtered and recrystallized twice from hexane to give 3.85 g. of 1,2-dihydro-1-hydroxy - 2 - benzylimino-4-diallylamino-6-methyl-1,3,5-triazine in the form of a white solid which gave a brown color to ethanolic ferric chloride; M.P. 84–86° C. (sintered at 75° C.).

*Part D.—2-dihydro-1-methoxy-2-benzylimino-4-diallylamino-6-methyl-1,3,5-triazine*

Following the procedure of Example 1, Part C, 1,2-dihydro - 1 - hydroxy - 2 - benzylimino-4-diallylamino-6-methyl -1,3,5-triazine (7.8 g.; 0.025 mole) was reacted with methyl iodide (7.1 g.; 0.05 mole) to give 1,2-dihydro-1 - methoxy - 2 - benzylimino-4-diallylamino-6-methyl-1,3,5-triazine hydriodide. The corresponding free base was obtained by adding excess aqueous ammonia to the hydriodide.

Following the procedure of Hirt et al., Helv. Chim. Acta 33, 1368 (1950) in reacting Grignard reagents with cyanuric chloride, using as the Grignard reagent, 2-naphthylmagnesium bromide; pentylmagnesium chloride; tert-butylmagnesium chloride; cyclopentylmagnesium bromide; 2,4-dimethylphenylmagnesium bromide; o-ethylphenethylmagnesium bromide; 2-methyl-3-pentenylmagnesium chloride; 4-fluoro-1-naphthylmethylmagnesium chloride; and 4-methyl-1-naphthylmagnesium bromide, there are obtained 2,4-dichloro-6-(2-naphthyl)1,3,5-triazine;
2,4-dichloro-6-pentyl-1,3,5-triazine;
2-tert-butyl-4,6-dichloro-1,3,5-triazine;
2,-cyclopentyl-4,6-dichloro-1,3,5-triazine;
2,4-dichloro-6-(2,4-dimethylphenyl)-1,3,5-triazine;
2,4-dichloro-6-(o-ethylphenylethyl)-1,3,5-triazine;
2,4-dichloro-6-(2-methyl-3-pentenyl)-1,3,5-triazine;
2,4-dichloro-6-(4-fluoro-1-naphthylmethyl)-1,3,5-triazine; and
2,4-dichloro-6-(4-methyl-1-naphthyl)-1,3,5-triazine, respectively.

Following the procedure of Example 28, Part A, but substituting for the combination of 2,4-dichloro-6-methyl-1,3,5-triazine and allylamine as reactants, one of the other dichloro-1,3,5-triazines listed above, in the order listed, and one of the following primary amines in the order listed: sec-butylamine; isopentylamine; octylamine; 4-hexenylamine; cyclooctylamine; 1-naphthylamine; phenethylamine; 4-phenylbutylamine; and 2-naphthylmethylamine, there are obtained 2-sec-butylamino-4-chloro-6-(2-naphthyl)-1,3,5-triazine;
2-chloro-4-isopentylamino-6-pentyl-1,3,5-triazine;
2-tert-butyl-4-chloro-6-octylamino-1,3,5-triazine;
2-chloro-4-cyclopentyl-6-(4-hexenylamino)1,3,5-triazine;
2-chloro-4-cyclooctylamino-6-(2,4-dimethylphenyl)-1,3,5-triazine;
2-chloro-4-(o-ethylphenethyl)-6-(1-naphthylamino)-1,3,5-triazine;
2-chloro-4-(2-methyl-3-pentenyl)-6-phenethylamino-1,3,5-triazine;
2-chloro-4-(4-fluoro-1-naphthylmethyl)-6-(4-phenylbutylamino)-1,3,5-triazine; and
2-chloro-4-(4-methyl-1-naphthyl)-6-(2-naphthylmethylamino) -1,3,5-triazine, respectively.

Following the procedure of Example 28, Part B, but substituting for the combination of 2-allylamino-4-chloro-6-methyl-1,3,5-triazine and diallylamine as reactants, one of the other monochloro-1,3,5-triazines listed above, in the order listed, and one of the following secondary amines in the order listed: diisobutylamine; dioctylamine; N-ethyl-4-pentenylamine; azetidine; heptamethylenimine; octamethylenimine; 2,2-dimethylpyrrolidine; 2-methyl-5-ethylpiperidine; and 2,6-dimethyl-4-octylpiperidine, there are obtained 2-sec-butylamino-4-diisobutylamino-6-(2-naphthyl)-1,3,5-triazine;
2-dioctylamino-4 isopentylamino-6-pentyl-1,3,5-triazine;
2-tert-butyl-4-(N-ethyl-4-pentenylamino)-6-octylamino-1,3,5-triazine;
2-(1-azetidinyl)-4-cyclopentyl-6-(4-hexenylamine)1,3,5-triazine;
2 - cyclooctylamine - 4-(2,4-dimethylphenyl)-6-(1-heptamethylenimino)-1,3,5-triazine;
2 - (o - ethylphenethyl)-4-(1-naphthylamino)-6-(1-octamethylenimino)-1,3,5-triazine;
2-(2,2-dimethyl-1-pyrrolidinyl)-4-(2-methyl-3-pentenyl)-6-phenethylamino-1,3,5-triazine;
2-(4-fluoro-1-naphthylmethyl)-4-(2-methyl-5-ethylpiperidino)-6-(4-phenylbutylamino)1,3,5-triazine; and
2-(2,6-dimethyl-4-octylpiperidino)-4-(4-methyl-1-naphthyl)-6-(2-naphthylmethylamino)-1,3,5-triazine, respectively.

Following the procedures of Part B of Examples 1, 4, 15, or 25 but substituting for the diamino-1,3,5-triazines used as reactants therein, each of the other diamino-1,3,5-triazines listed above, in the order listed, there are obtained 1,2 - dihydro - 1 - hydroxy-2-sec-butylimino-4-diisobutylamino-6-(2-naphthyl)-1,3,5-triazine;

1,2-dihydro-1-hydroxy-4-dioctylamino-2-isopentylimino-
   6-pentyl-1,3,5-triazine;
1,2-dihydro-1-hydroxy-6-tert-butyl-4-(N-ethyl-4-pentenyl-
   amino)-2-octylimino-1,3,5-triazine;
1,2-dihydro-1-hydroxy-4-(1-azetidinyl)-6-cyclopentyl-2-
   (4-hexenylimino)-1,3,5-triazine;
1,2-dihydro-1-hydroxy-2-cyclooctylimino-6-(2,4-dimeth-
   ylphenyl)-4-(1-heptamethylenimino)-1,3,5-triazine;
1,2-dihydro-1-hydroxy-6-o-ethylphenethyl-2-(1-naphthyl-
   imino)-4-(1-octamethylenimino)-1,3,5-triazine;
1,2-dihydro-1-hydroxy-4-(2,2-dimethyl-1-pyrrolidinyl)-6-
   (2-methyl-3-pentenyl)-6-phenethylimino-1,3,5-triazine;
1,2-dihydro-1-hydroxy-6-(4-fluoro-1-naphthylmethyl)-4-
   (2-methyl-5-ethylpiperidino)-2-(4-phenylbutylimino)-
   1,3,5-triazine; and
1,2-dihydro-1-hydroxy-4-(2,6-dimethyl-4-octylpiperidino)-
   6-(4-methyl-1-naphthyl)-2-(2-naphthylmethylimino)-
   1,3,5-triazine, respectively.

Following the procedure of Example 1, Part C, but substituting for the 1,2-dihydro-1-hydroxy-1,3,5-triazine used as a reactant therein, each of the other 1,2-dihydro-1-hydroxy-1,3,5-triazines listed above, in the order listed, there are obtained 1,2 - dihydro - 1 - allyloxy-2-sec-butylimino-4-diisobutyl-
   amino-6-(2-naphthyl)-1,3,5-triazine;
1,2-dihydro-1-allyloxy-4-dioctylamino-2-isopentylimino-
   6-pentyl-1,3,5-triazine;
1,2-dihydro-1,allyloxy-6-tert-butyl-4-(N-ethyl-4-pentenyl-
   amino)-2-octylimino-1,3,5-triazine;
1,2-dihydro-1-allyloxy-4-(1-azetidinyl)-6-cyclopentyl-2-
   (4-hexenylimino)-1,3,5-triazine;
1,2-dihydro-1-allyloxy-2-cyclooctylimino-6-(2,4-dimethyl-
   phenyl)-4-(1-heptamethylenimino)-1,3,5-triazine;
1,2-dihydro-1-allyloxy-6-o-ethylphenethyl-2-(1-naphthyl-
   imino)-4-(1-octamethylenimino)-1,3,5-triazine;
1,2-dihydro-1-allyloxy-4-(2,2-dimethyl-1-pyrrolidinyl)-6-
   (2-methyl-3-pentenyl)-6-phenethylimino-1,3,5-triazine;
1,2-dihydro-1-allyloxy-6-(4-fluoro-1-naphthylmethyl)-
   4-(2-methyl-5-ethylpiperidino)-2-(4-phenylbutylimi-
   no)-1,3,5-triazine; and
1,2 - dihydro - 1 - allyloxy-4-(2,6-dimethyl-4-octylpiperi-
   dino)-6-(4-methyl-1-naphthyl)-2-(2-naphthylmethyl-
   imino)-1,3,5-triazine, respectively.

I claim:
1. A compound selected from the group consisting of the free base form and acid addition salts of a compound of the formula:

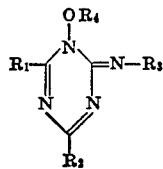

wherein $R_1$ is selected from the group consisting of hydrogen, lower alkyl, lower alkenyl, lower alkoxyalkyl, lower cycloalkyl, lower aryl, lower alkaryl, lower aralkyl, lower alkaralkyl, lower alkoxyaralkyl, and lower haloaralkyl; wherein $R_2$ is selected from the group consisting of di-lower-alkylamino, di-lower-alkenylamino, N-lower-alkyl-lower-alkenylamino, and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substitutents on carbon atoms thereof zero to 3 lower alkyls, inclusive, the nitrogen atom of $R_2$ being the point of attachment of $R_2$ to the ring in said formula; wherein $R_3$ is selected from the group consisting of hydrogen, lower alkyl, lower alkenyl, lower cycloalkyl, lower aryl, and lower aralkyl; and wherein $R_4$ is selected from the group consisting of lower alkyl, lower alkenyl, lower lakynyl, lower cycloalkyl, lower aralkyl, lower alkaralkyl, lower alkoxyaralkyl, and lower haloaralkyl.

2. A compound selected from the group consisting of the free base form and acid addition salts of a compound of the formula:

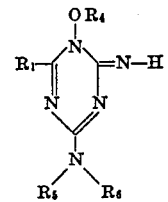

wherein $R_1$ is selected from the group consisting of hydrogen, lower alkyl, lower alkenyl, lower alkoxyalkyl, lower cycloalkyl, lower aryl. lower alkaryl, lower aralkyl, lower alkaralkyl, lower alkoxyaralkyl, and lower haloaralkyl; wherein $R_4$ is selected from the group consisting of lower alkyl, lower alkenyl, lower alkynyl, lower cycloalkyl, lower aralkyl, lower alkaralkyl, lower alkoxyaralkyl, and lower haloaralkyl; and wherein $R_5$ and $R_6$ are lower alkenyl.

3. 1,2 - dihydro - 1 - allyloxy-4-diallylamino-2-imino-6-methyl-1,3,5-triazine.

4. 1,2 - dihydro - 1 - allyloxy-4-diallylamino-2-imino-6-methyl-1,3,5-triazine hydrochloride.

References Cited by the Examiner

Fuson: "Reactions of Organic Compounds," Wiley and Sons, Inc., New York (1962) p. 285.

Morrison and Boyd: "Organic Chemistry," Allyn and Bacon, Boston (1959), pp. 412–3.

WALTER A. MODANCE, *Primary Examiner.*

JOHN M. FORD, *Assistant Examiner.*